United States Patent
He et al.

(10) Patent No.: US 12,199,888 B2
(45) Date of Patent: Jan. 14, 2025

(54) RELIABLE TRANSPORT OFFLOADED TO NETWORK DEVICES

(71) Applicant: Intel Corporation, Santa Clara, CA (US)

(72) Inventors: Shaopeng He, Shanghai (CN); Cunming Liang, Shanghai (CN); Jiang Yu, Shanghai (CN); Ziye Yang, Shanghai (CN); Ping Yu, Shanghai (CN); Bo Cui, Shanghai (CN); Jingjing Wu, Shanghai (CN); Liang Ma, Shannon (IE); Hongjun Ni, Shanghai (CN); Zhiguo Wen, Shanghai (CN); Changpeng Liu, Shanghai (CN); Anjali Singhai Jain, Portland, OR (US); Daniel Daly, Santa Barbara, CA (US); Yadong Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/425,968

(22) Filed: Jan. 29, 2024

(65) Prior Publication Data
US 2024/0283756 A1    Aug. 22, 2024

Related U.S. Application Data

(63) Continuation of application No. 17/981,255, filed on Nov. 4, 2022, now Pat. No. 11,936,571, which is a
(Continued)

(51) Int. Cl.
*H04L 49/9057* (2022.01)
*H04L 1/1829* (2023.01)
(Continued)

(52) U.S. Cl.
CPC ........ *H04L 49/9057* (2013.01); *H04L 1/1841* (2013.01); *H04L 47/34* (2013.01);
(Continued)

(58) Field of Classification Search
None
See application file for complete search history.

(56) References Cited

U.S. PATENT DOCUMENTS 8,839,370 B2    9/2014  Singh et al.
10,552,274 B1   2/2020  Zhao et al.
(Continued)

FOREIGN PATENT DOCUMENTS

CN   112513988 A      3/2021
WO   2020030311 A1    2/2020
(Continued)

OTHER PUBLICATIONS

An Pratt and Keir Fraser, Arsenic: A User-Accessible Gigabit Ethernet Interface, year 2001, IEEE, 0-7803-7016-3/01, pp. 67-76 (Year: 2001).*

(Continued)

*Primary Examiner* — Kouroush Mohebbi
(74) *Attorney, Agent, or Firm* — Compass IP Law PC

(57) ABSTRACT

Examples described herein relate to offload reliable transport management to a network interface device and store packets to be resent, based on received packet receipt acknowledgements (ACKs), into one or more kernel space queues that are also accessible in user space.

20 Claims, 21 Drawing Sheets

Related U.S. Application Data continuation of application No. 17/238,893, filed on Apr. 23, 2021, now Pat. No. 11,496,419.

(60) Provisional application No. 63/145,327, filed on Feb. 3, 2021.

(51) Int. Cl.
*H04L 47/34* (2022.01)
*H04L 47/56* (2022.01)
*H04L 49/552* (2022.01)
*H04L 49/90* (2022.01)

(52) U.S. Cl.
CPC ............ *H04L 47/56* (2013.01); *H04L 49/552* (2013.01); *H04L 49/9094* (2013.01)

(56) References Cited

U.S. PATENT DOCUMENTS

| | | | |
|---|---|---|---|
| 2011/0299409 A1* | 12/2011 | Vobbilisetty | H04L 45/66 370/252 |
| 2015/0180736 A1 | 6/2015 | Leung | |
| 2018/0295045 A1 | 10/2018 | Bali et al. | |
| 2019/0044812 A1 | 2/2019 | Loftus et al. | |
| 2019/0044994 A1 | 2/2019 | Sarangam et al. | |
| 2019/0190891 A1 | 6/2019 | Pillai et al. | |
| 2020/0053064 A1 | 2/2020 | Oprisan et al. | |
| 2020/0099628 A1 | 3/2020 | Parikh et al. | |
| 2020/0133795 A1 | 4/2020 | Rhodes et al. | |
| 2020/0236140 A1 | 7/2020 | Srinivasan et al. | |
| 2020/0287813 A1 | 9/2020 | Kutch et al. | |
| 2020/0319812 A1 | 10/2020 | He et al. | |
| 2021/0103403 A1 | 4/2021 | He et al. | |
| 2021/0117242 A1 | 4/2021 | Groenendaal et al. | |
| 2021/0243247 A1 | 4/2021 | He | |
| 2021/0266253 A1 | 4/2021 | He | |
| 2021/0194828 A1 | 6/2021 | He et al. | |
| 2021/0352044 A1* | 11/2021 | Asveren | H04L 61/2517 |
| 2022/0029929 A1 | 1/2022 | Jain | |
| 2022/0103530 A1 | 3/2022 | Daly | |

FOREIGN PATENT DOCUMENTS

| | | | |
|---|---|---|---|
| WO | 2020041569 A1 | 2/2020 | |
| WO | 2022125211 A1 | 6/2022 | |
| WO | 2022169519 A1 | 8/2022 | |
| WO | 2022225639 A1 | 10/2022 | |

OTHER PUBLICATIONS

Marcelo Abranches et al., 'A Userspace Transport Stack Doesn't Have to Mean Losing Linux Processing', 2020 IEEE Conference on Network Function Virtualization and Softwme Defined Networks (NFV-SDN), Dec. 24, 2020.*
U.S. Appl. No. 17/238,893, filed Apr. 23, 2021, He et al.
"HTTP and gRPC Transcoding", AIP-127, https://google.aip.dev/127, Last updated Aug. 22, 2019, 3 pages.
"Improving Network Monitoring and Management with Programmable Data Planes", ONF, https://opennetworking.org/news-and-events/blog/improving-network-monitoring-and-management-with-programmable-data-planes/, Sep. 25, 2015, 5 pages.
"In-band Network Telemetry (INT) Dataplane Specification", Version 2.1, The P4.org Applications Working Group, Nov. 11, 2020, 56 pages.
"Intel® Ethernet Adaptive Virtual Function (AVF) Hardware Architecture Specification (HAS)", Intel Networking Division, Revision: 1.0, Feb. 2018, 90 pages.
"Introduction to Intel Ethernet Flow Director and Memcached Performance", Intel White Paper, Oct. 13, 2014, 6 pages.
"Networking architecture", Security Guide Docmentation, https://docs.openstack.org/security-guide/networking/architecture.html, Jul. 27, 2021, 6 pages.
"OpenStack Networking Guide", openstack, https://docs.openstack.org/mitaka/networking-guide/, updated Aug. 16, 2019, 3 pages.
"P4-16 Language Specification", version 1.2.1, The P4 Language Consortium, Jun. 11, 2020, 113 pages.
"Transcoding HTTP/JSON to gRPC", Google Cloud Endpoints, cloud.google.com/endpoints/docs/grpc/transcoding, downloaded from the internet Jul. 28, 2021, 14 pages.
"Trellis", Overview, Trellis is an open-source multi-purpose L2/L3 leaf-spine switching fabric., https://docs.trellisfabric.org/1.12/index.html, © Copyright 2019, Open Networking Foundation, 4 pages.
Bosshart, Pat, et al., "P4: programming protocol-independent packet processors", ACM SIGCOMM Computer Communication Review vol. 44 Issue 3, https://dl.acm.org/doi/pdf/10.1145/2656877.2656890, published Jul. 28, 2014, 9 pages.
Colyer, Adrian, "Snap: a microkernel approach to host networking", the morning paper, https://blog.acolyer.org/2019/11/11/snap-networking/, Nov. 11, 2019, 6 pages.
Crilly, Liam, "Introducing a Technology Preview of NGINX Support for QUIC and HTTP/3", NGINX, https://www.nginx.com/blog/introducing-technology-preview-nginx-support-for-quic-http-3/, Jun. 10, 2020, 4 pages.
Diptanu Gon Choudhury, 'XDP-Programmable Data Path in the Linux Kernel', ;login: Spring 2018, vol. 43, No. 1, pp. 26-30, 2018, 6 pages.
First Office Action for U.S. Appl. No. 17/981,255, Mailed May 24, 2023, 7 pages.
Ian Pratt and Keir Fraser, Arsenic: A User-Accessible Gigabit Ethernet Interface, year 2001, IEEE, 0-7803-7016-3/01, pp. 67-76 (Year: 2001).
Intel, "Intel Ethernet Adaptive Virtual Function (AVF) Hardware Architecture Specification (HAS)", Networking Division, Revision: 1.0, Feb. 2018, 90 pages.
Intel, "Introduction to Intel® Ethernet Flow Director and Memcached Performance", White Paper, Intel® Ethernet Flow Director and Memcached Performance, Copyright © 2014 Intel Corporation, 6 pages.
International Search Report and Written Opinion for PCT Patent Application No. PCT/US21/57130, Mailed Feb. 21, 2022, 10 pages.
International Search Report and Written Opinion for PCT Patent Application No. PCT/US21/65177, Mailed Apr. 25, 2022, 10 pages.
International Search Report and Written Opinion for PCT Patent Application No. PCT/US22/11045, Mailed Apr. 25, 2022, 11 pages.
International Search Report and Written Opinion for PCT Patent Application No. PCT/US22/21795, Mailed Jun. 24, 2022, 12 pages.
Irfan, Talal, "AF_XDP101L Getting Started With an In-Kernel network stack Bypass", Published in Emumba, https://blog.emumba.com/af-xdp-101-getting-started-with-an-in-kernel-network-stack-bypass-6e6901a285c8, Jun. 24, 2020, 10 pages.
Iyengar, Ed, et. al., "QUIC: A UDP-Based Multiplexed and Secure Transport draft-ietf-quic-transport-29", QUIC Standards Track, https://datatracker.ietf.org/doc/html/draft-ietf-quic-transport-29#page-23, Jun. 10, 2020, 191 pages.
Karlsson Magnus, et al., 'The path to DPDK speeds for AF XDP', Linux Plumbers Conference, 2018, 9 pages.
Karlsson, Magnus, "Performance I40E 64-Byte Packets", Fast Packet Processing in Linux with AF_XDP, FOSDEM 2018, 1 page.
Li Xing, Alibaba, et. al., "Hyperscale rte_flow toward productoin is really happening" DPDK Data Pane Development Kit, DPDK Summit Bordeaux 2019, 25 pages.
Marcelo Abranches, et. al., 'A Userspace Transport Stack Doesn't Have to Mean Losing Linux Processing', 2020 IEEE Conference on Nettwork Function Virtualization and Software Defined Networks (NFV-SDN), Dec. 24, 2020, 7 pages.
Mvs, Janakiram, "Service Mesh—The New Battleground For the Platfor Wars", Sep. 20, 2020, 8 pages.
Nguyen Van Tu, et al., 'Accelerating Virtual Network Functions with Fast-Slow Path Architecture using express Data Path', IEEE Transactions on Network and Service Management vol. 17. Issue 3, Jun. 5, 2020, 13 pages.

(56) References Cited

OTHER PUBLICATIONS

Notice of Allowance for U.S. Appl. No. 17/238,893, Mailed Feb. 9, 2022, 10 pages.
Notice of Allowance for U.S. Appl. No. 17/238,893, Mailed Jun. 13, 2022, 8 pages.
Notice of Allowance for U.S. Appl. No. 17/981,255, Mailed Oct. 27, 2023, 8 pages.
P4.org, "Improving Network Monitoring and Management with Progammable Data Planes", ONF, https://opennetworking.org/news-and-events/blog/improving-network-monitoring-and-management-with-programmable-data-planes/, Sep. 25, 2015, 7 pages.
Peterson, Larry, "Trellis", Dashboard / CORD—Wiki Home / Project and Domains of Use, https://wiki.opecord.org/display/CORD/Trellis, Jul. 27, 2021, 3 pages.
Postel, J., "User Datagram Protocol", RFC 768, Aug. 28, 1980, 4 pages.
Wiggins, Adam, "The Twelve-Factor App", VII. Port binding, https://12factor.net/port-binding, Last updated 2017, 1 page.
Xing, Li, et al., "Hyperscale rte_flow toward production is really happening", DPDK https://dpdkbordeaux2019.sched.com/event/RmZG, Sep. 20, 2019, 25 pages.
Zhang, Jiao, et al., "Fast Switch-Based Load Balancer Considering Application Server States", IEEE, https://ieeexplore.ieee.org/document/9061132.
Extended European Search Report for Patent Application No. 21925082.6, Mailed Nov. 25, 2024, 14 pages.

* cited by examiner

RELIABLE TRANSPORT OFFLOADED TO NETWORK DEVICES

RELATED APPLICATION

This application is a continuation of U.S. patent application Ser. No. 17/981,255, filed Nov. 4, 2022, which is a continuation of U.S. patent application Ser. No. 17/238,893, filed Apr. 23, 2021, now U.S. Pat. No. 11,496,419, which claims the benefit of priority of U.S. Provisional application No. 63/145,327, filed Feb. 3, 2021. The entire specifications of which are hereby incorporated herein by reference in their entirety.

DESCRIPTION

A reliable transport protocol attempts to provide reliability of transmission of packets in a network by tracking receipt of packet sequence numbers at a transmitter and receiver. Reliable transport can support features such as smaller retransmission windows, selective acknowledgement, multi-path transmission, ordering, congestion control, and adaptive rate adjustments. Transmission control protocol (TCP) and Quick User Datagram Protocol (UDP) Internet Connections (QUIC) are examples of reliable transport protocols. Examples of custom high-performance reliable transports can be seen in products and publications and include Amazon Web Services (AWS) Elastic Fabric Adapter (EFA) and Scalable Reliable Datagram (SRD); Microsoft Azure Distributed Universal Access (DUA) and Lightweight Transport Layer (LTL); and Google GCP Snap Microkernel Pony Express.

Reliable transport of packets is a key feature for cloud platforms that execute microservices. Microservices may utilize a service mesh infrastructure to provide communication between microservices and coordination of microservice execution. The mesh network can provide communications among microservices. The mesh network can be built by cloud service providers (CSPs) using closely coupled hardware and software components. Managing east-west traffic (e.g., traffic among virtual machines or containers in a same host within a data center) among microservices allows the option for tail latency (e.g., worst case latency) to be addressed by hardware accelerated reliable transport.

Address Family of the express Data Path (AF_XDP) is a Linux socket type built upon the Extended Berkeley Packet Filter (eBPF) and express Data Path (XDP) technology. An AF_XDP socket receives and sends packets from an eBPF/XDP-based program attached to the network device (netdev) bypassing Linux kernel's subsystems. AF_XDP sockets may enable the possibility for XDP programs to redirect frames to a memory buffer accessible to a user-space application. An AF_XDP socket (XSK) can be created by a socket( ) syscall. XDP or eXpress Data path can provide an in kernel component that processes received packets by a driver. XDP programs can be written as an eBPF program attached to a driver. Instead of using a user space driver, the user space application can directly read or make changes to network packet data and make decisions on how to handle the packet at an earlier stage with the attached XDP program so that the kernel stack may be bypassed in the data path.

Applications such as NGINIX may send and receive packet payload via an AF_XDP socket and various headers (e.g., UDP, Internet Protocol (IP), Ethernet) can be added optionally including a Stream ID as an inner virtual local area network (VLAN) tag and can be added or removed by a network interface controller (NIC) driver using a header buffer split feature. An intermediate layer (IL) in NIC AF_XDP driver can insert Packet Number (PN) into packets as VLAN Tag using a NIC transport descriptor field. A receive side IL can extract and verify PN and send receipt acknowledgements (ACKs) to a transmitter. A transmit side IL can release ACKed packets from a buffer from an AF_XDP transmit ring and re-transmit non-ACKed packets to make sure all packets are received at a destination.

DETAILED DESCRIPTION

Figure 1:
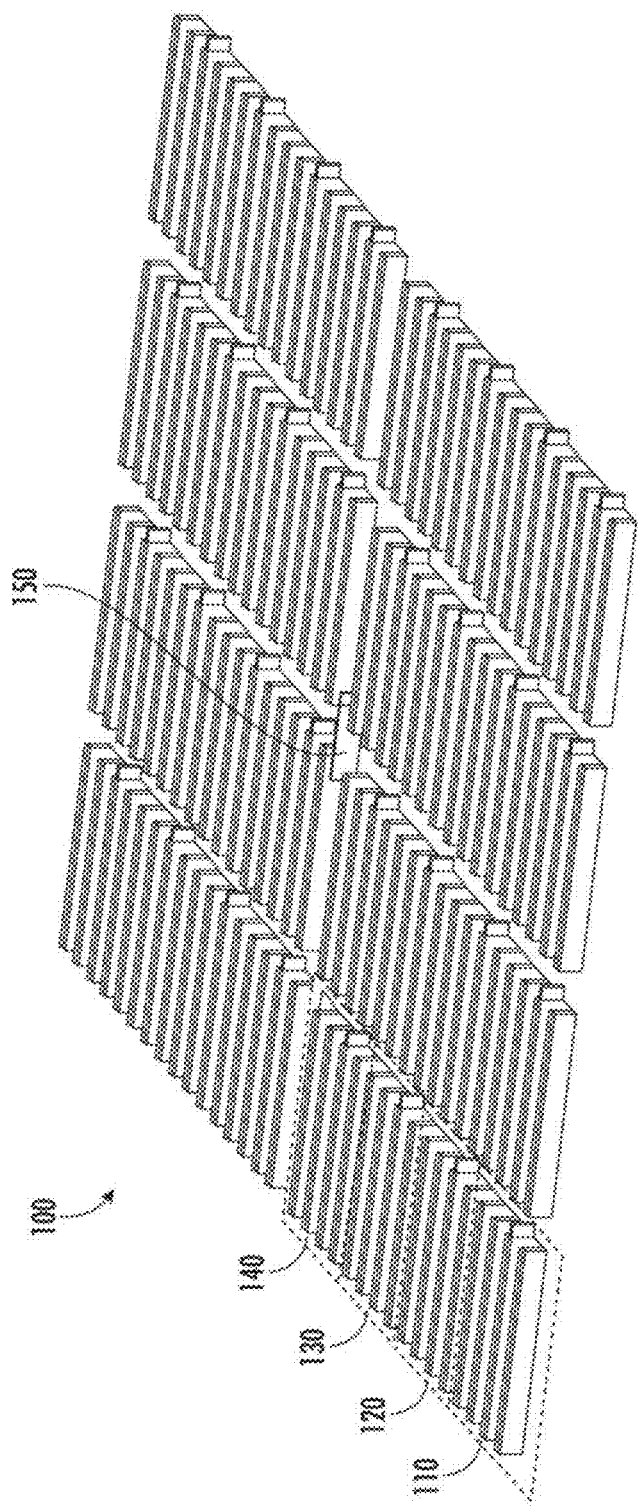
FIG. 1 is a simplified diagram of at least one embodiment of a data center for executing workloads with disaggregated resources.

FIG. 1 depicts a data center in which disaggregated resources may cooperatively execute one or more workloads (e.g., applications on behalf of customers) that includes multiple systems 110, 70, 130, 80, a system being or including one or more rows of racks, racks, or trays. Of course, although data center 100 is shown with multiple systems, in some embodiments, the data center 100 may be embodied as a single system. As described in more detail herein, each rack houses multiple nodes, some of which may be equipped with one or more type of resources (e.g., memory devices, data storage devices, accelerator devices, general purpose processors, GPUs, xPUs, CPUs, field programmable gate arrays (FPGAs), or application-specific integrated circuits (ASICs)). Resources can be logically coupled or aggregated to form a composed node or composite node, which can act as, for example, a server to perform a job, workload or microservices.

Various examples described herein can perform an application composed of microservices, where each microservice runs in its own process and communicates using protocols (e.g., application program interface (API), a Hypertext Transfer Protocol (HTTP) resource API, message service, remote procedure calls (RPC), or Google RPC (gRPC)).

Microservices can be independently deployed using centralized management of these services. The management system may be written in different programming languages and use different data storage technologies. A microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery.

In the illustrative embodiment, the nodes in each system 110, 70, 130, 80 are connected to multiple system switches (e.g., switches that route data communications to and from nodes within the system). Switches can be positioned top of rack (TOR), end of row (EOR), middle of rack (MOR), or a position in a rack or row. The system switches, in turn, connect with spine switches 90 that switch communications among systems (e.g., the systems 110, 70, 130, 80) in the data center 100. In some embodiments, the nodes may be connected with a fabric using standards described herein or proprietary standards. In other embodiments, the nodes may be connected with other fabrics, such as InfiniBand or Ethernet. As described in more detail herein, resources within nodes in the data center 100 may be allocated to a group (referred to herein as a "managed node") containing resources from one or more nodes to be collectively utilized in the execution of a workload. The workload can execute as if the resources belonging to the managed node were located on the same node. The resources in a managed node may belong to nodes belonging to different racks, and even to different systems 110, 70, 130, 80. As such, some resources of a single node may be allocated to one managed node while other resources of the same node are allocated to a different managed node (e.g., one processor assigned to one managed node and another processor of the same node assigned to a different managed node).

The disaggregation of resources to nodes comprised predominantly of a single type of resource (e.g., compute nodes comprising primarily compute resources, memory nodes containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources. For example, because nodes predominantly contain resources of a particular type, resources of a given type can be upgraded independently of other resources. Additionally, because different resource types (processors, memory, storage, accelerators, etc.) typically have different refresh rates, greater resource utilization and reduced total cost of ownership may be achieved. For example, a data center operator can upgrade the processors throughout their facility by only swapping out the compute nodes. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
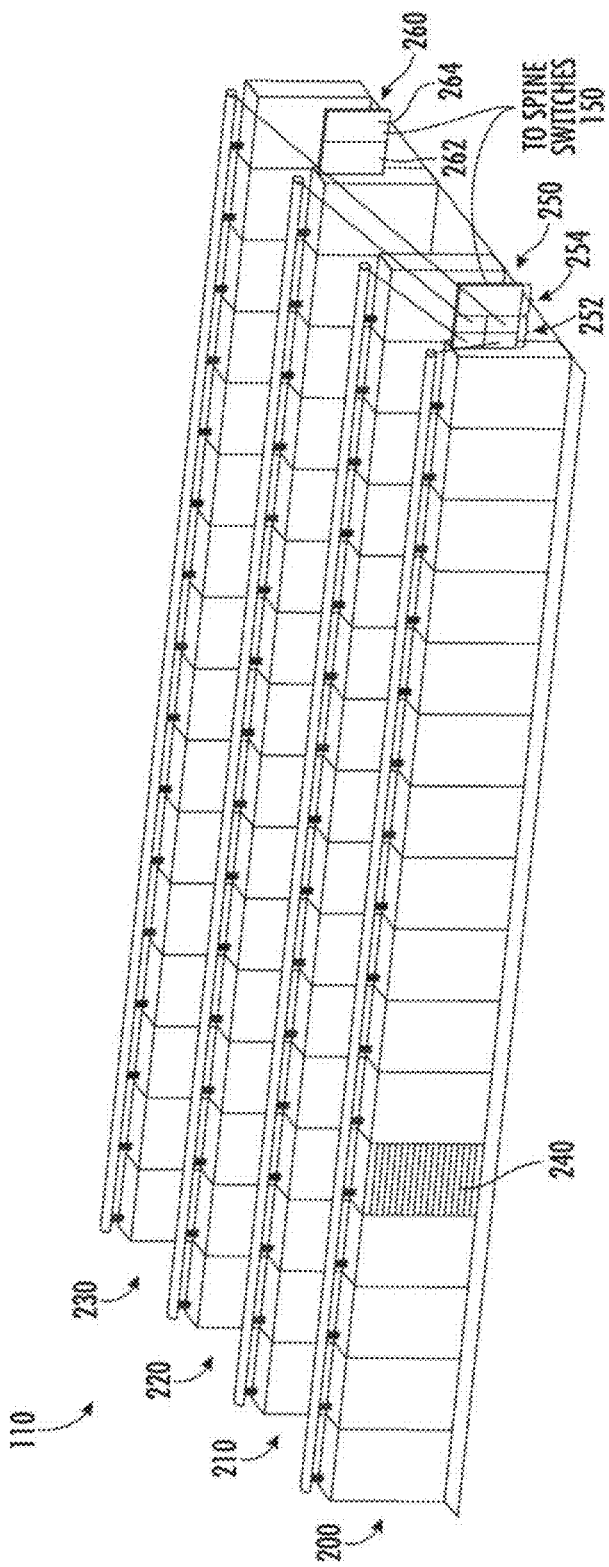
FIG. 2 is a simplified diagram of at least one embodiment of a system that may be included in a data center.

FIG. 2 depicts a system. A system can include a set of rows 200, 210, 220, 230 of racks 240. Each rack 240 may house multiple nodes (e.g., sixteen nodes) and provide power and data connections to the housed nodes, as described in more detail herein. In the illustrative embodiment, the racks in each row 200, 210, 220, 230 are connected to multiple system switches 250, 260. The system switch 250 includes a set of ports 252 to which the nodes of the racks of the system 110 are connected and another set of ports 254 that connect the system 110 to the spine switches 90 to provide connectivity to other systems in the data center 100. Similarly, the system switch 260 includes a set of ports 262 to which the nodes of the racks of the system 110 are connected and a set of ports 264 that connect the system 110 to the spine switches 90. As such, the use of the pair of switches 250, 260 provides an amount of redundancy to the system 110. For example, if either of the switches 250, 260 fails, the nodes in the system 110 may still maintain data communication with the remainder of the data center 100 (e.g., nodes of other systems) through the other switch 250, 260. Furthermore, in the illustrative embodiment, the switches 90, 250, 260 may be embodied as dual-mode optical switches, capable of routing both Ethernet protocol communications carrying Internet Protocol (IP) packets and communications according to a second, high-performance link-layer protocol (e.g., PCI Express or Compute Express Link) via optical signaling media of an optical fabric.

It should be appreciated that each of the other systems 70, 130, 80 (as well as additional systems of the data center 100) may be similarly structured as, and have components similar to, the system 110 shown in and described in regard to FIG. 2 (e.g., each system may have rows of racks housing multiple nodes as described above). Additionally, while two system switches 250, 260 are shown, it should be understood that in other embodiments, each system 110, 70, 130, 80 may be connected to a different number of system switches, providing even more failover capacity. Of course, in other embodiments, systems may be arranged differently than the rows-of-racks configuration shown in FIGS. 1-2. For example, a system may be embodied as multiple sets of racks in which each set of racks is arranged radially, e.g., the racks are equidistant from a center switch.

Figure 3:
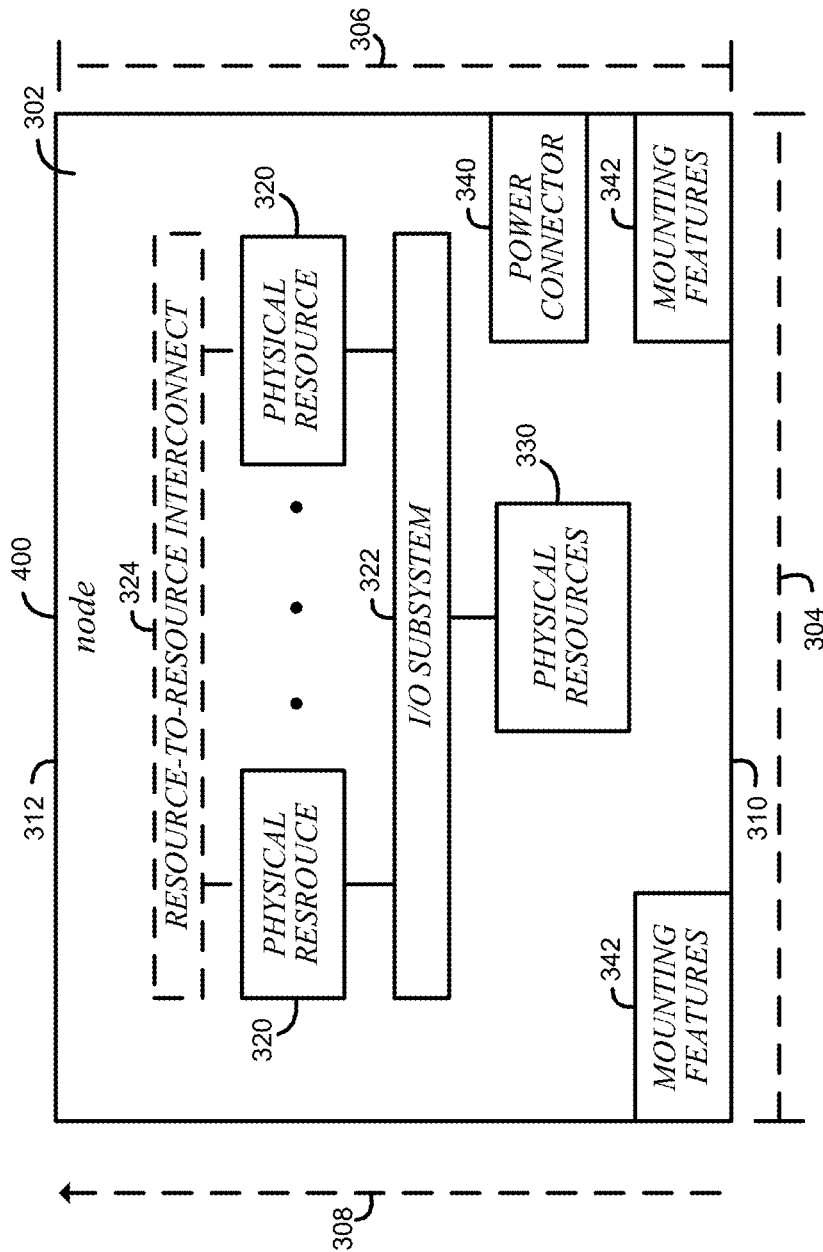
FIG. 3 is a simplified block diagram of at least one embodiment of a top side of a node.

Referring now to FIG. 3, node 400, in the illustrative embodiment, is configured to be mounted in a corresponding rack 240 of the data center 100 as discussed above. In some embodiments, each node 400 may be optimized or otherwise configured for performing particular tasks, such as compute tasks, acceleration tasks, data storage tasks, etc. For example, the node 400 may be embodied as a compute node 500 as discussed below in regard to FIG. 5, an accelerator node 600 as discussed below in regard to FIG. 6, a storage node 700 as discussed below in regard to FIG. 7, or as a node optimized or otherwise configured to perform other specialized tasks, such as a memory node 800, discussed below in regard to FIG. 8.

Although two physical resources 320 are shown in FIG. 3, it should be appreciated that the node 400 may include one, two, or more physical resources 320 in other embodiments. The physical resources 320 may be embodied as any type of processor, controller, or other compute circuit capable of performing various tasks such as compute functions and/or controlling the functions of the node 400 depending on, for example, the type or intended functionality of the node 400. For example, as discussed in more detail below, the physical resources 320 may be embodied as high-performance processors in embodiments in which the node 400 is embodied as a compute node, as accelerator co-processors or circuits in embodiments in which the node 400 is embodied as an accelerator node, storage controllers in embodiments in which the node 400 is embodied as a storage node, or a set of memory devices in embodiments in which the node 400 is embodied as a memory node.

The node 400 also includes one or more additional physical resources 330 mounted to circuit board substrate 302. In the illustrative embodiment, the additional physical resources include a network interface controller (NIC) as discussed in more detail below. Of course, depending on the type and functionality of the node 400, the physical resources 330 may include additional or other electrical components, circuits, and/or devices in other embodiments.

The physical resources 320 can be communicatively coupled to the physical resources 330 via an input/output (I/O) subsystem 322. The I/O subsystem 322 may be embodied as circuitry and/or components to facilitate input/output operations with the physical resources 320, the physical resources 330, and/or other components of the node 400. For example, the I/O subsystem 322 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 322 is embodied as, or otherwise includes, a double data rate 4 (DDR4) data bus or a DDR5 data bus.

In some embodiments, the node 400 may also include a resource-to-resource interconnect 324. The resource-to-resource interconnect 324 may be embodied as any type of communication interconnect capable of facilitating resource-to-resource communications. In the illustrative embodiment, the resource-to-resource interconnect 324 is embodied as a high-speed point-to-point interconnect (e.g., faster than the I/O subsystem 322). For example, the resource-to-resource interconnect 324 may be embodied as a QuickPath Interconnect (QPI), an UltraPath Interconnect (UPI), PCI express (PCIe), or other high-speed point-to-point interconnect dedicated to resource-to-resource communications.

The node 400 also includes a power connector 340 configured to mate with a corresponding power connector of the rack 240 when the node 400 is mounted in the corresponding rack 240. The node 400 receives power from a power supply of the rack 240 via the power connector 340 to supply power to the various electrical components of the node 400. In some examples, the node 400 includes local power supply (e.g., an on-board power supply) to provide power to the electrical components of the node 400. In some examples, the node 400 does not include any local power supply (e.g., an on-board power supply) to provide power to the electrical components of the node 400. The exclusion of a local or on-board power supply facilitates the reduction in the overall footprint of the circuit board substrate 302, which may increase the thermal cooling characteristics of the various electrical components mounted on the circuit board substrate 302 as discussed above. In some embodiments, voltage regulators are placed on circuit board substrate 302 directly opposite of the processors 520 (see FIG. 5), and power is routed from the voltage regulators to the processors 520 by vias extending through the circuit board substrate 302. Such a configuration provides an increased thermal budget, additional current and/or voltage, and better voltage control relative to typical printed circuit boards in which processor power is delivered from a voltage regulator, in part, by printed circuit traces.

In some embodiments, the node 400 may also include mounting features 342 configured to mate with a mounting arm, or other structure, of a robot to facilitate the placement of the node 300 in a rack 240 by the robot. The mounting features 342 may be embodied as any type of physical structures that allow the robot to grasp the node 400 without damaging the circuit board substrate 302 or the electrical components mounted thereto. For example, in some embodiments, the mounting features 342 may be embodied as non-conductive pads attached to the circuit board substrate 302. In other embodiments, the mounting features may be embodied as brackets, braces, or other similar structures attached to the circuit board substrate 302. The particular number, shape, size, and/or make-up of the mounting feature 342 may depend on the design of the robot configured to manage the node 400.

Figure 4:
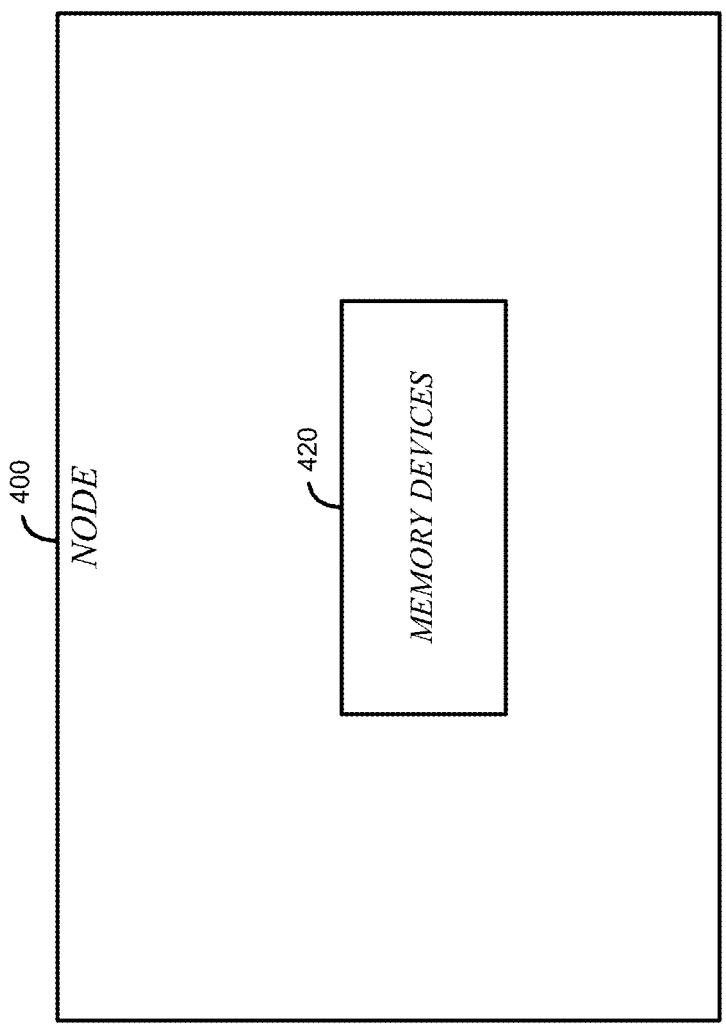
FIG. 4 is a simplified block diagram of at least one embodiment of a bottom side of a node.

Referring now to FIG. 4, in addition to the physical resources 330 mounted on circuit board substrate 302, the node 400 also includes one or more memory devices 420. The physical resources 320 can be communicatively coupled to memory devices 420 via the I/O subsystem 322. For example, the physical resources 320 and the memory devices 420 may be communicatively coupled by one or more vias extending through the circuit board substrate 302. A physical resource 320 may be communicatively coupled to a different set of one or more memory devices 420 in some embodiments. Alternatively, in other embodiments, each physical resource 320 may be communicatively coupled to each memory device 420.

The memory devices 420 may be embodied as any type of memory device capable of storing data for the physical resources 320 during operation of the node 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies, for example, multi-threshold level NAND flash memory and NOR flash memory. A block can be any size such as but not limited to 2 KB, 4 KB, 5 KB, and so forth. A memory device may also include next-generation nonvolatile devices, such as Intel Optane® memory or other byte addressable write-in-place nonvolatile memory devices (e.g., memory devices that use chalcogenide glass), multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 5:
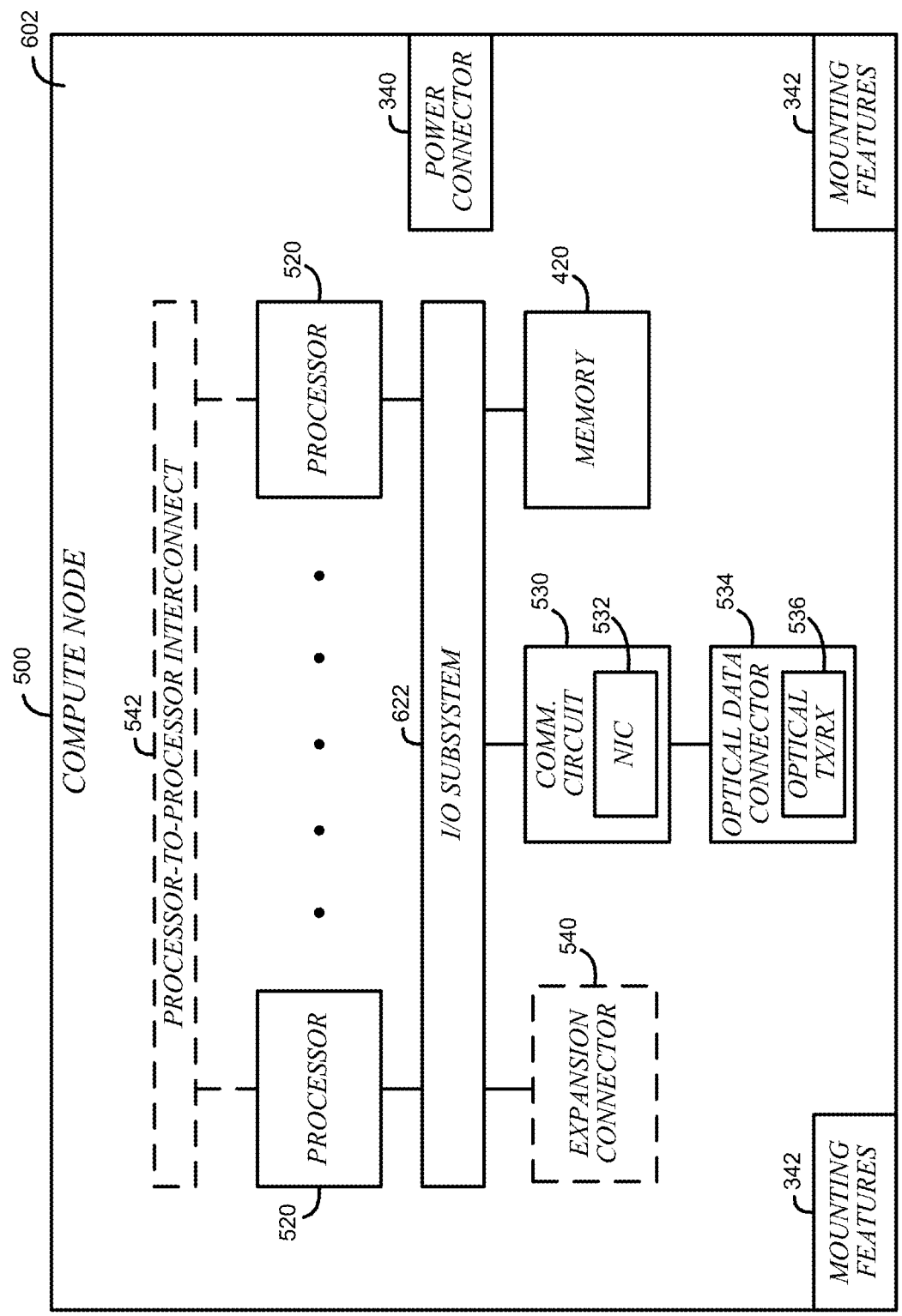
FIG. 5 is a simplified block diagram of at least one embodiment of a compute node.

Referring now to FIG. 5, in some embodiments, the node 400 may be embodied as a compute node 500. The compute node 500 can be configured to perform compute tasks. Of course, as discussed above, the compute node 500 may rely on other nodes, such as acceleration nodes and/or storage nodes, to perform compute tasks. In the illustrative compute node 500, the physical resources 320 are embodied as processors 520. Although only two processors 520 are shown in FIG. 5, it should be appreciated that the compute node 500 may include additional processors 520 in other embodiments. Illustratively, the processors 520 are embodied as high-performance processors 520 and may be configured to operate at a relatively high power rating.

In some embodiments, the compute node 500 may also include a processor-to-processor interconnect 542. Processor-to-processor interconnect 542 may be embodied as any type of communication interconnect capable of facilitating processor-to-processor interconnect 542 communications. In the illustrative embodiment, the processor-to-processor interconnect 542 is embodied as a high-speed point-to-point interconnect (e.g., faster than the I/O subsystem 322). For example, the processor-to-processor interconnect 542 may be embodied as a QuickPath Interconnect (QPI), an UltraPath Interconnect (UPI), or other high-speed point-to-point interconnect dedicated to processor-to-processor communications (e.g., PCIe or CXL).

The compute node 500 also includes a communication circuit 530. The illustrative communication circuit 530 includes a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the compute node 500 to connect with another compute device (e.g., with other nodes 400). In some embodiments, the NIC 532 may be embodied as part of a system-on-a-chip (SoC) that includes one or more processors, or included on a multichip package that also contains one or more processors. In some embodiments, the NIC 532 may include a local processor (not shown) and/or a local memory (not shown) that are both local to the NIC 532. In such embodiments, the local processor of the NIC 532 may be capable of performing one or more of the functions of the processors 520. Additionally or alternatively, in such embodiments, the local memory of the NIC 532 may be integrated into one or more components of the compute node at the board level, socket level, chip level, and/or other levels. In some examples, a network interface includes a network interface controller or a network interface card. In some examples, a network interface can include one or more of a network interface controller (NIC) 532, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

Some examples of a NIC are part of an Infrastructure Processing Unit (IPU) or data processing unit (DPU) or utilized by an IPU or DPU. An IPU or DPU can include a network interface, memory devices, and one or more programmable or fixed function processors (e.g., CPU or XPU) to perform offload of operations that could have been performed by a host CPU or XPU or remote CPU or XPU. In some examples, the IPU or DPU can perform virtual switch operations, manage storage transactions (e.g., compression, cryptography, virtualization), and manage operations performed on other IPUs, DPUs, servers, or devices.

The communication circuit 530 is communicatively coupled to an optical data connector 534. The optical data connector 534 is configured to mate with a corresponding optical data connector of a rack when the compute node 500 is mounted in the rack. Illustratively, the optical data connector 534 includes a plurality of optical fibers which lead from a mating surface of the optical data connector 534 to an optical transceiver 536. The optical transceiver 536 is configured to convert incoming optical signals from the rack-side optical data connector to electrical signals and to convert electrical signals to outgoing optical signals to the rack-side optical data connector. Although shown as forming part of the optical data connector 534 in the illustrative embodiment, the optical transceiver 536 may form a portion of the communication circuit 530 in other embodiments.

In some embodiments, the compute node 500 may also include an expansion connector 540. In such embodiments, the expansion connector 540 is configured to mate with a corresponding connector of an expansion circuit board substrate to provide additional physical resources to the compute node 500. The additional physical resources may be used, for example, by the processors 520 during operation of the compute node 500. The expansion circuit board substrate may be substantially similar to the circuit board substrate 302 discussed above and may include various electrical components mounted thereto. The particular electrical components mounted to the expansion circuit board substrate may depend on the intended functionality of the expansion circuit board substrate. For example, the expansion circuit board substrate may provide additional compute resources, memory resources, and/or storage resources. As such, the additional physical resources of the expansion circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits. Note that reference to GPU or CPU herein can in addition or alternatively refer to an XPU or xPU. An xPU can include one or more of: a GPU, ASIC, FPGA, or accelerator device.

Figure 6:
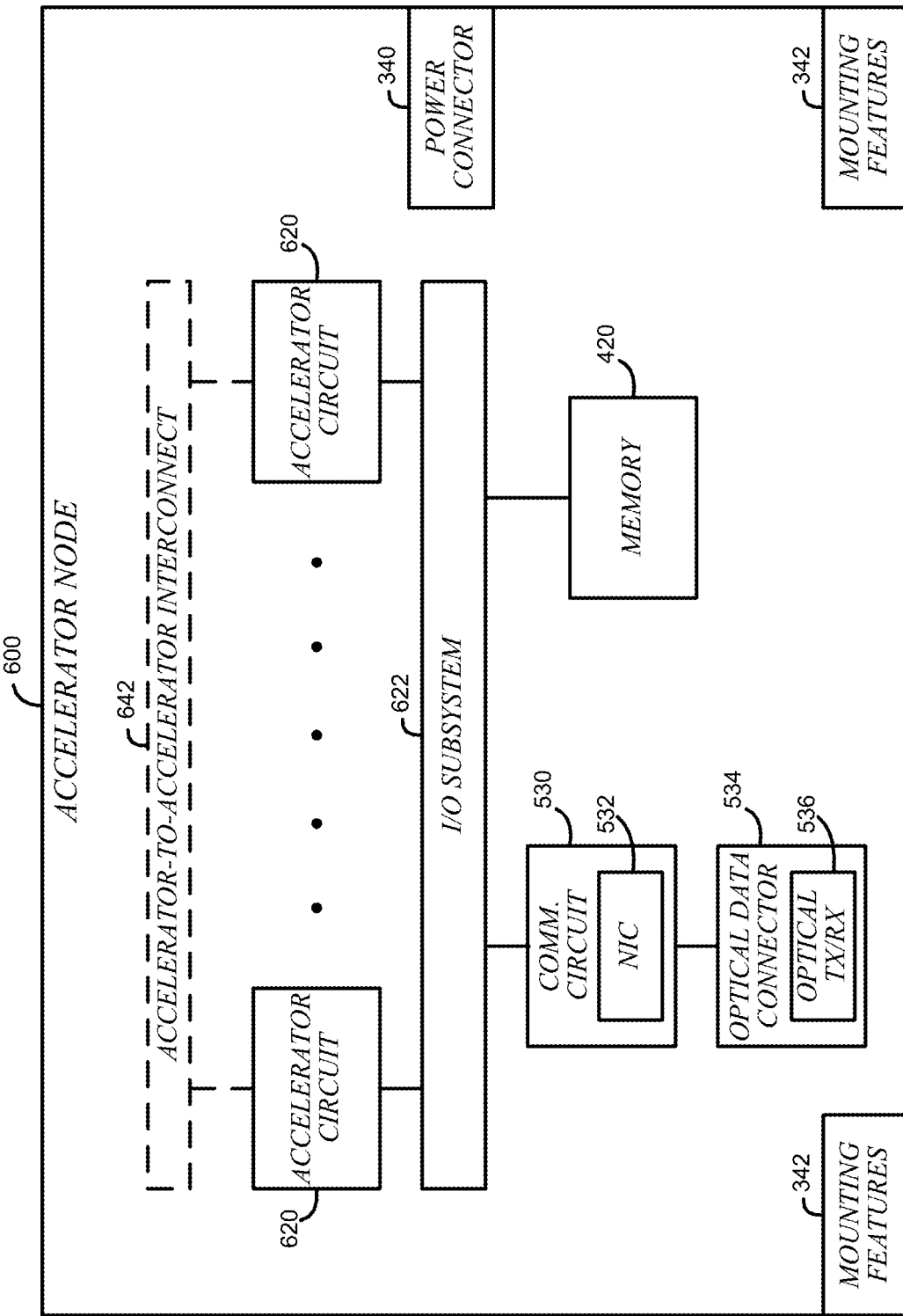
FIG. 6 is a simplified block diagram of at least one embodiment of an accelerator node usable in a data center.

Referring now to FIG. 6, in some embodiments, the node 400 may be embodied as an accelerator node 600. The accelerator node 600 is configured to perform specialized compute tasks, such as machine learning, encryption, hashing, or other computational-intensive task. In some embodiments, for example, a compute node 500 may offload tasks to the accelerator node 600 during operation. The accelerator node 600 includes various components similar to components of the node 400 and/or compute node 500, which have been identified in FIG. 6 using the same reference numbers.

In the illustrative accelerator node 600, the physical resources 320 are embodied as accelerator circuits 620. Although only two accelerator circuits 620 are shown in FIG. 6, it should be appreciated that the accelerator node 600 may include additional accelerator circuits 620 in other embodiments. The accelerator circuits 620 may be embodied as any type of processor, co-processor, compute circuit, or other device capable of performing compute or processing operations. For example, the accelerator circuits 620 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, programmable processing pipeline (e.g., programmable by P4, C, Python, Broadcom Network Programming Language (NPL), or x86 compatible executable binaries or other executable binaries). Processors, FPGAs, other specialized processors, controllers, devices, and/or circuits can be used utilized for packet processing or packet modification. Ternary content-addressable memory (TCAM) can be used for parallel match-action or look-up operations on packet header content.

In some embodiments, the accelerator node 600 may also include an accelerator-to-accelerator interconnect 642. Similar to the resource-to-resource interconnect 324 of the node 300 discussed above, the accelerator-to-accelerator interconnect 642 may be embodied as any type of communication interconnect capable of facilitating accelerator-to-accelerator communications. In the illustrative embodiment, the accelerator-to-accelerator interconnect 642 is embodied as a high-speed point-to-point interconnect (e.g., faster than the I/O subsystem 322). For example, the accelerator-to-accelerator interconnect 642 may be embodied as a QuickPath Interconnect (QPI), an UltraPath Interconnect (UPI), or other high-speed point-to-point interconnect dedicated to processor-to-processor communications. In some embodiments, the accelerator circuits 620 may be daisy-chained with a primary accelerator circuit 620 connected to the NIC 532 and memory 420 through the I/O subsystem 322 and a secondary accelerator circuit 620 connected to the NIC 532 and memory 420 through a primary accelerator circuit 620.

Figure 7:
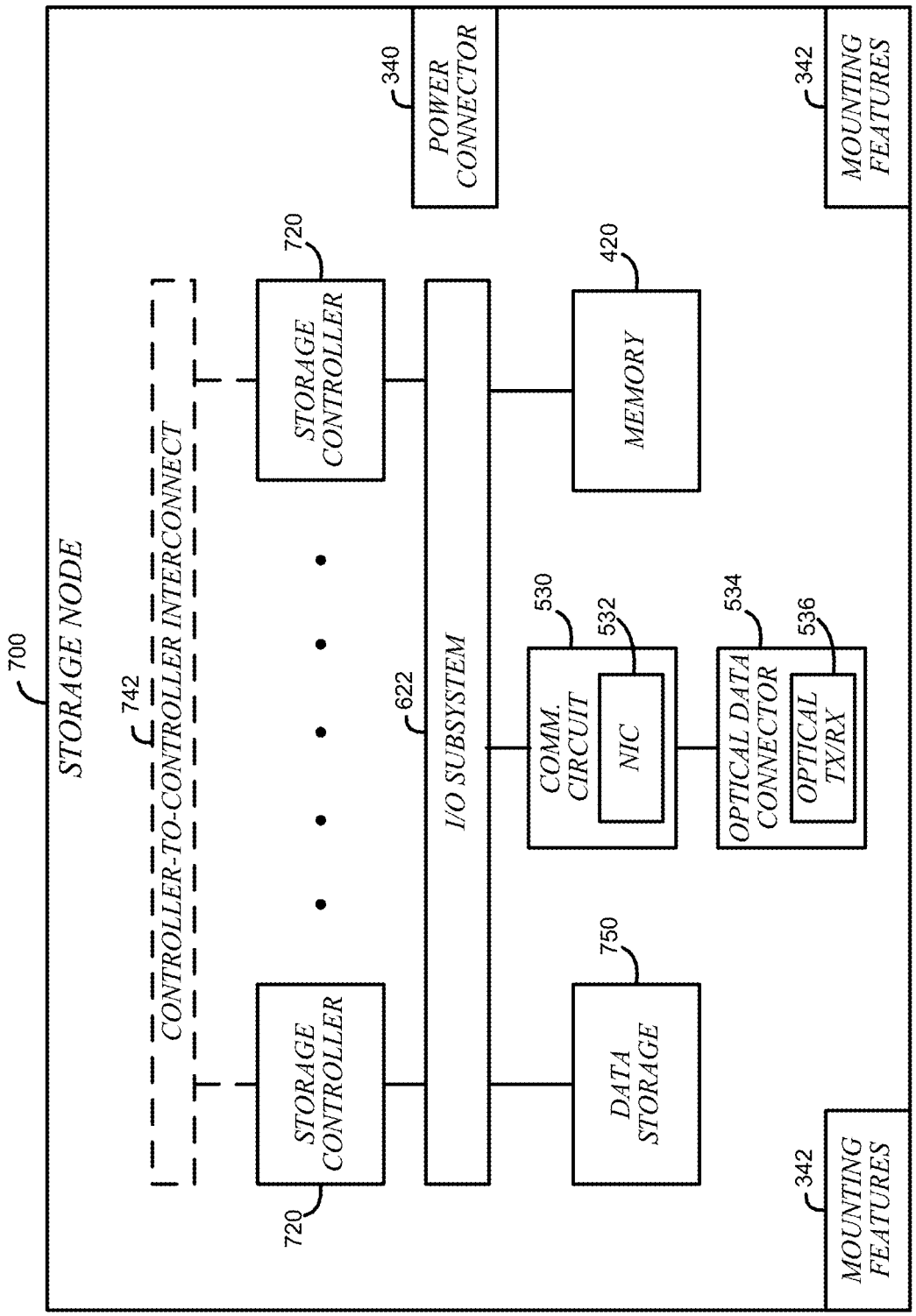
FIG. 7 is a simplified block diagram of at least one embodiment of a storage node usable in a data center.

Referring now to FIG. 7, in some embodiments, the node 400 may be embodied as a storage node 700. The storage node 700 is configured, to store data in a data storage 750 local to the storage node 700. For example, during operation, a compute node 500 or an accelerator node 600 may store and retrieve data from the data storage 750 of the storage node 700. The storage node 700 includes various components similar to components of the node 400 and/or the compute node 500, which have been identified in FIG. 7 using the same reference numbers.

In the illustrative storage node 700, the physical resources 320 are embodied as storage controllers 720. Although only two storage controllers 720 are shown in FIG. 7, it should be appreciated that the storage node 700 may include additional storage controllers 720 in other embodiments. The storage controllers 720 may be embodied as any type of processor, controller, or control circuit capable of controlling the storage and retrieval of data into the data storage 750 based on requests received via the communication circuit 530. In the illustrative embodiment, the storage controllers 720 are embodied as relatively low-power processors or controllers.

In some embodiments, the storage node 700 may also include a controller-to-controller interconnect 742. Similar to the resource-to-resource interconnect 324 of the node 400 discussed above, the controller-to-controller interconnect 742 may be embodied as any type of communication interconnect capable of facilitating controller-to-controller communications. In the illustrative embodiment, the controller-to-controller interconnect 742 is embodied as a high-speed point-to-point interconnect (e.g., faster than the I/O subsystem 322). For example, the controller-to-controller interconnect 742 may be embodied as a QuickPath Interconnect (QPI), an UltraPath Interconnect (UPI), or other high-speed point-to-point interconnect dedicated to processor-to-processor communications.

Figure 8:
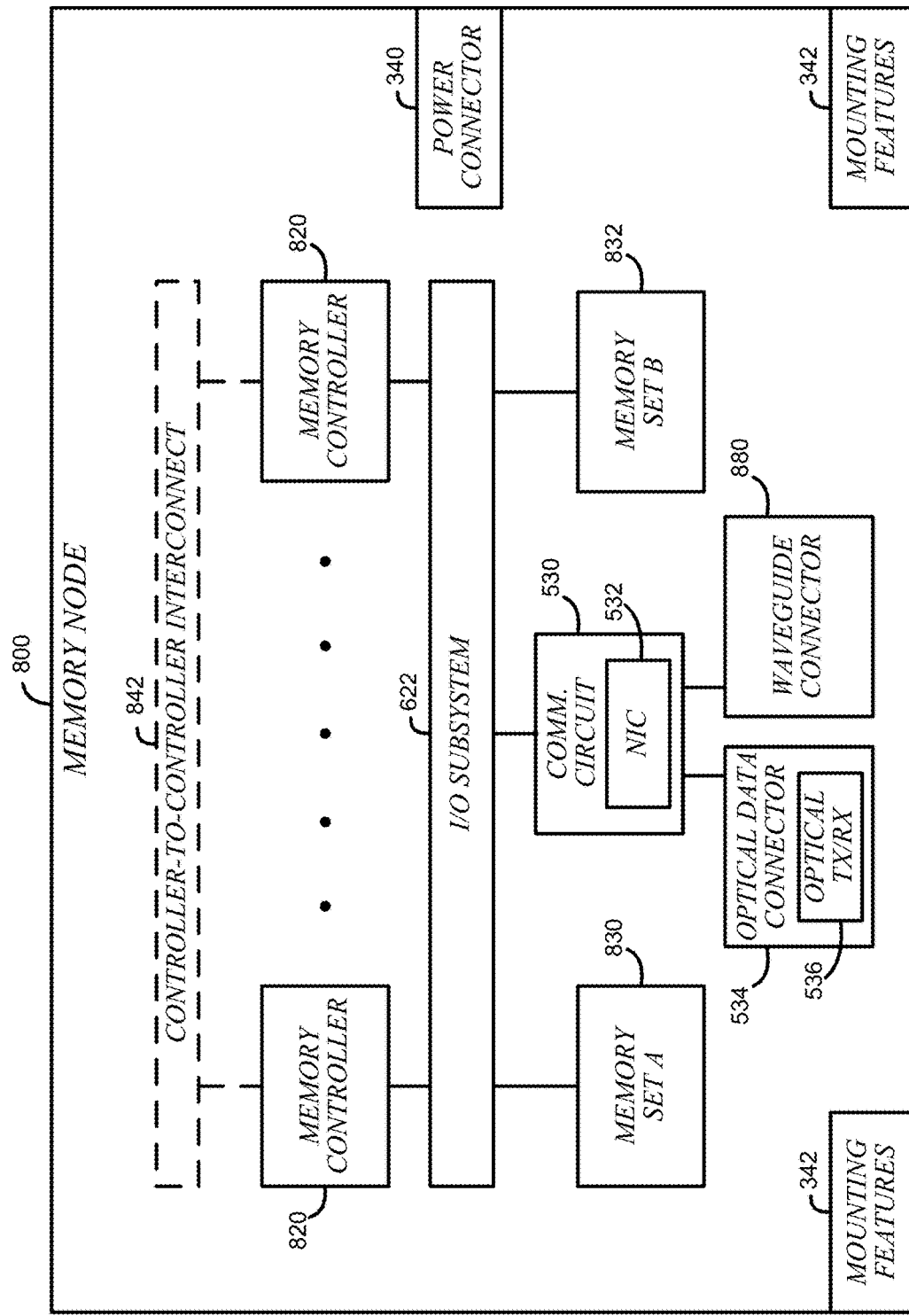
FIG. 8 is a simplified block diagram of at least one embodiment of a memory node usable in a data center.

Referring now to FIG. 8, in some embodiments, the node 400 may be embodied as a memory node 800. The memory node 800 is configured to provide other nodes 400 (e.g., compute nodes 500, accelerator nodes 600, etc.) with access to a pool of memory (e.g., in two or more sets 830, 832 of memory devices 420) local to the storage node 700. For example, during operation, a compute node 500 or an accelerator node 600 may remotely write to and/or read from one or more of the memory sets 830, 832 of the memory node 800 using a logical address space that maps to physical addresses in the memory sets 830, 832.

In the illustrative memory node 800, the physical resources 320 are embodied as memory controllers 820. Although only two memory controllers 820 are shown in FIG. 8, it should be appreciated that the memory node 800 may include additional memory controllers 820 in other embodiments. The memory controllers 820 may be embodied as any type of processor, controller, or control circuit capable of controlling the writing and reading of data into the memory sets 830, 832 based on requests received via the communication circuit 530. In the illustrative embodiment, each memory controller 820 is connected to a corresponding memory set 830, 832 to write to and read from memory devices 420 within the corresponding memory set 830, 832 and enforce a permissions (e.g., read, write, etc.) associated with node 400 that has sent a request to the memory node 800 to perform a memory access operation (e.g., read or write).

In some embodiments, the memory node 800 may also include a controller-to-controller interconnect 842. Similar to the resource-to-resource interconnect 324 of the node 400 discussed above, the controller-to-controller interconnect 842 may be embodied as any type of communication interconnect capable of facilitating controller-to-controller communications. In the illustrative embodiment, the controller-to-controller interconnect 842 is embodied as a high-speed point-to-point interconnect (e.g., faster than the I/O subsystem 322). For example, the controller-to-controller interconnect 842 may be embodied as a QuickPath Interconnect (QPI), an UltraPath Interconnect (UPI), or other high-speed point-to-point interconnect dedicated to processor-to-processor communications. As such, in some embodiments, a memory controller 820 may access, through the controller-to-controller interconnect 842, memory that is within the memory set 832 associated with another memory controller 820. In some embodiments, a scalable memory controller is made of multiple smaller memory controllers, referred to herein as "chiplets", on a memory node (e.g., the memory node 800). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 820 may implement a memory interleave (e.g., one memory address is mapped to the memory set 830, the next memory address is mapped to the memory set 832, and the third address is mapped to the memory set 830, etc.). The interleaving may be managed within the memory controllers 820, or from CPU sockets (e.g., of the compute node 500) across network links to the memory sets 830, 832, and may improve the latency associated with performing memory access operations as compared to accessing contiguous memory addresses from the same memory device.

Further, in some embodiments, the memory node 800 may be connected to one or more other nodes 400 (e.g., in the same rack 240 or an adjacent rack 240) through a waveguide, using the waveguide connector 880. Using a waveguide may provide high throughput access to the memory pool (e.g., the memory sets 830, 832) to another node (e.g., a node 400 in the same rack 240 or an adjacent rack 240 as the memory node 800) without adding to the load on the optical data connector 534.

Figure 9:
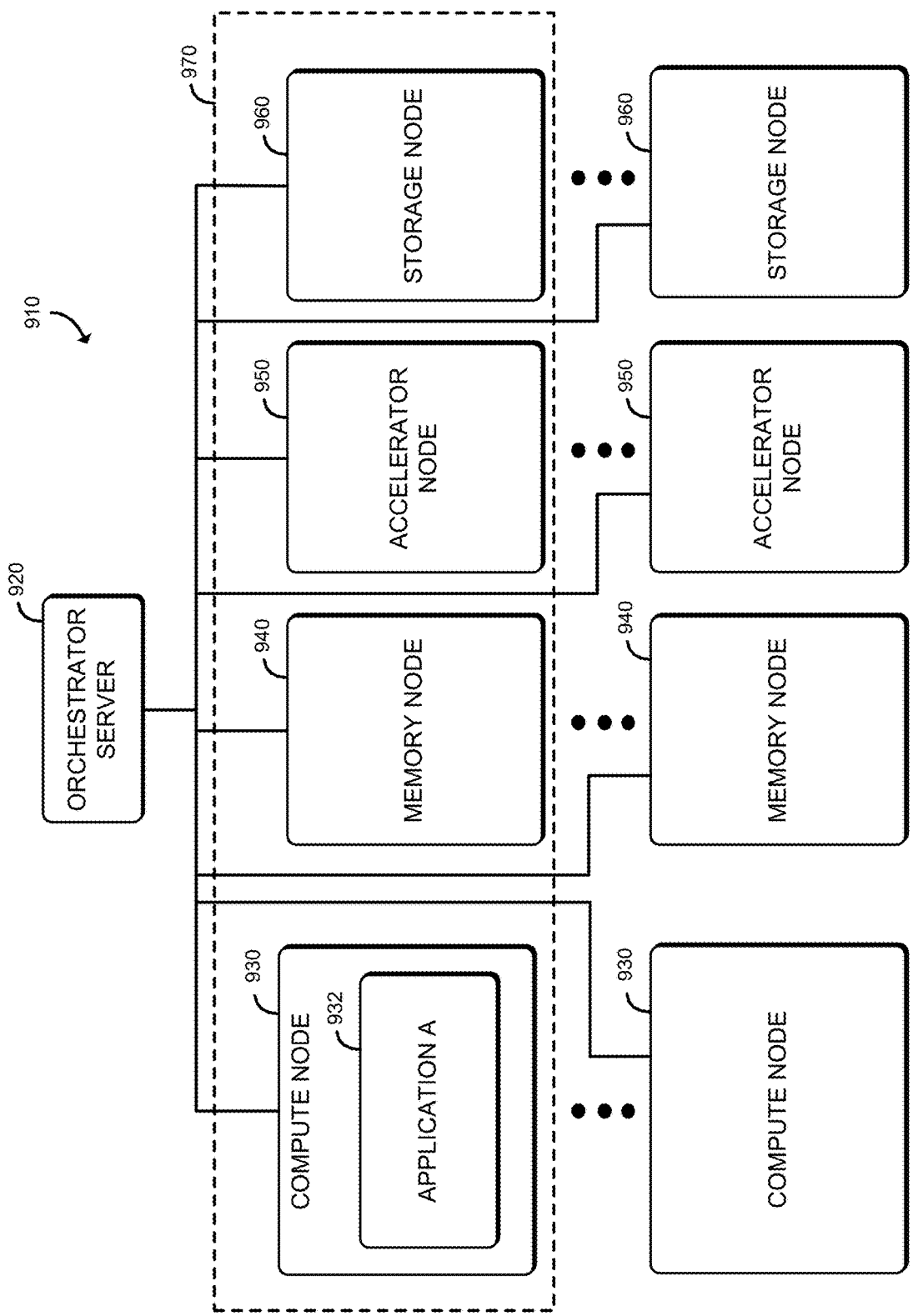
FIG. 9 depicts a system for executing one or more workloads.

Referring now to FIG. 9, a system for executing one or more workloads (e.g., applications) may be implemented. In the illustrative embodiment, the system 910 includes an orchestrator server 920, which may be embodied as a managed node comprising a compute device (e.g., a processor 520 on a compute node 500) executing management software (e.g., a cloud operating environment, such as OpenStack) that is communicatively coupled to multiple nodes 400 including a large number of compute nodes 930 (e.g., each similar to the compute node 500), memory nodes 940 (e.g., each similar to the memory node 800), accelerator nodes 950 (e.g., each similar to the memory node 600), and storage nodes 960 (e.g., each similar to the storage node 700). One or more of the nodes 930, 940, 950, 960 may be grouped into a managed node 970, such as by the orchestrator server 920, to collectively perform a workload (e.g., an application 932 executed in a virtual machine or in a container).

The managed node 970 may be embodied as an assembly of physical resources 320, such as processors 520, memory resources 420, accelerator circuits 620, or data storage 750, from the same or different nodes 400. Further, the managed node may be established, defined, or "spun up" by the orchestrator server 920 at the time a workload is to be assigned to the managed node or at a time, and may exist regardless of whether a workload is presently assigned to the managed node. In the illustrative embodiment, the orchestrator server 920 may selectively allocate and/or deallocate physical resources 320 from the nodes 400 and/or add or remove one or more nodes 400 from the managed node 970 as a function of quality of service (QOS) targets (e.g., a target throughput, a target latency, a target number instructions per second, etc.) associated with a service level agreement or class of service (COS or CLOS) for the workload (e.g., the application 932). In doing so, the orchestrator server 920 may receive telemetry data indicative of performance conditions (e.g., throughput, latency, instructions per second, etc.) in each node 400 of the managed node 970 and compare the telemetry data to the quality of service targets to determine whether the quality of service targets are being satisfied. The orchestrator server 920 may additionally determine whether one or more physical resources may be deallocated from the managed node 970 while still satisfying the QoS targets, thereby freeing up those physical resources for use in another managed node (e.g., to execute a different workload). Alternatively, if the QoS targets are not presently satisfied, the orchestrator server 920 may determine to dynamically allocate additional physical resources to assist in the execution of the workload (e.g., the application 932) while the workload is executing. Similarly, the orchestrator server 920 may determine to dynamically deallocate physical resources from a managed node if the orchestrator server 920 determines that deallocating the physical resource would result in QoS targets still being met.

Additionally, in some embodiments, the orchestrator server 920 may identify trends in the resource utilization of the workload (e.g., the application 932), such as by identifying phases of execution (e.g., time periods in which different operations, each having different resource utilizations characteristics, are performed) of the workload (e.g., the application 932) and pre-emptively identifying available resources in the data center and allocating them to the managed node 970 (e.g., within a predefined time period of the associated phase beginning). In some embodiments, the orchestrator server 920 may model performance based on various latencies and a distribution scheme to place workloads among compute nodes and other resources (e.g., accelerator nodes, memory nodes, storage nodes) in the data center. For example, the orchestrator server 920 may utilize a model that accounts for the performance of resources on the nodes 400 (e.g., FPGA performance, memory access latency, etc.) and the performance (e.g., congestion, latency, bandwidth) of the path through the network to the resource (e.g., FPGA). As such, the orchestrator server 920 may determine which resource(s) should be used with which workloads based on the total latency associated with each potential resource available in the data center 100 (e.g., the latency associated with the performance of the resource itself in addition to the latency associated with the path through the network between the compute node executing the workload and the node 400 on which the resource is located).

In some embodiments, the orchestrator server 920 may generate a map of heat generation in the data center 100 using telemetry data (e.g., temperatures, fan speeds, etc.) reported from the nodes 400 and allocate resources to managed nodes as a function of the map of heat generation and predicted heat generation associated with different workloads, to maintain a target temperature and heat distribution in the data center 100. Additionally or alternatively, in some embodiments, the orchestrator server 920 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 920 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 920 may identify patterns in resource utilization phases of the workloads and use the patterns to predict future resource utilization of the workloads.

To reduce the computational load on the orchestrator server 920 and the data transfer load on the network, in some embodiments, the orchestrator server 920 may send self-test information to the nodes 400 to enable each node 400 to locally (e.g., on the node 400) determine whether telemetry data generated by the node 400 satisfies one or more conditions (e.g., an available capacity that satisfies a predefined threshold, a temperature that satisfies a predefined threshold, etc.). Each node 400 may then report back a simplified result (e.g., yes or no) to the orchestrator server 920, which the orchestrator server 920 may utilize in determining the allocation of resources to managed nodes.

Embodiments described herein can be used in a data center or disaggregated composite nodes. The techniques described herein can apply to both disaggregated and traditional server architectures. A traditional server can include a CPU, XPU, one or more memory devices, networking communicatively coupled to one or more circuit boards within a server.

Edge Network

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in a high performance compute data center or cloud installation; a designated edge node server, an enterprise server, a roadside server, a telecom central office; or a local or peer at-the-edge device being served consuming edge services).

With the illustrative edge networking systems described below, computing and storage resources are moved closer to the edge of the network (e.g., closer to the clients, endpoint devices, or "things"). By moving the computing and storage resources closer to the device producing or using the data, various latency, compliance, and/or monetary or resource cost constraints may be achievable relative to a standard networked (e.g., cloud computing) system. To do so, in some examples, pools of compute, memory, and/or storage resources may be located in, or otherwise equipped with, local servers, routers, and/or other network equipment. Such local resources facilitate the satisfying of constraints placed on the system. For example, the local compute and storage resources allow an edge system to perform computations in real-time or near real-time, which may be a consideration in low latency user-cases such as autonomous driving, video surveillance, and mobile media consumption. Additionally, these resources will benefit from service management in an edge system which provides the ability to scale and achieve local service level agreements (SLAs) or service level objectives (SLOs), manage tiered service requirements, and enable local features and functions on a temporary or permanent basis.

A pool can include a device on a same chassis or different physically dispersed devices on different chassis or different racks. A resource pool can include homogeneous processors, homogeneous processors, and/or a memory pool.

An illustrative edge computing system may support and/or provide various services to endpoint devices (e.g., client user equipment (UEs)), each of which may have different requirements or constraints. For example, some services may have priority or quality-of-service (QoS) constraints (e.g., traffic data for autonomous vehicles may have a higher priority than temperature sensor data), reliability and resiliency (e.g., traffic data may require mission-critical reliability, while temperature data may be allowed some error variance), as well as power, cooling, and form-factor constraints. These and other technical constraints may offer significant complexity and technical challenges when applied in the multi-stakeholder setting.

Figure 10:
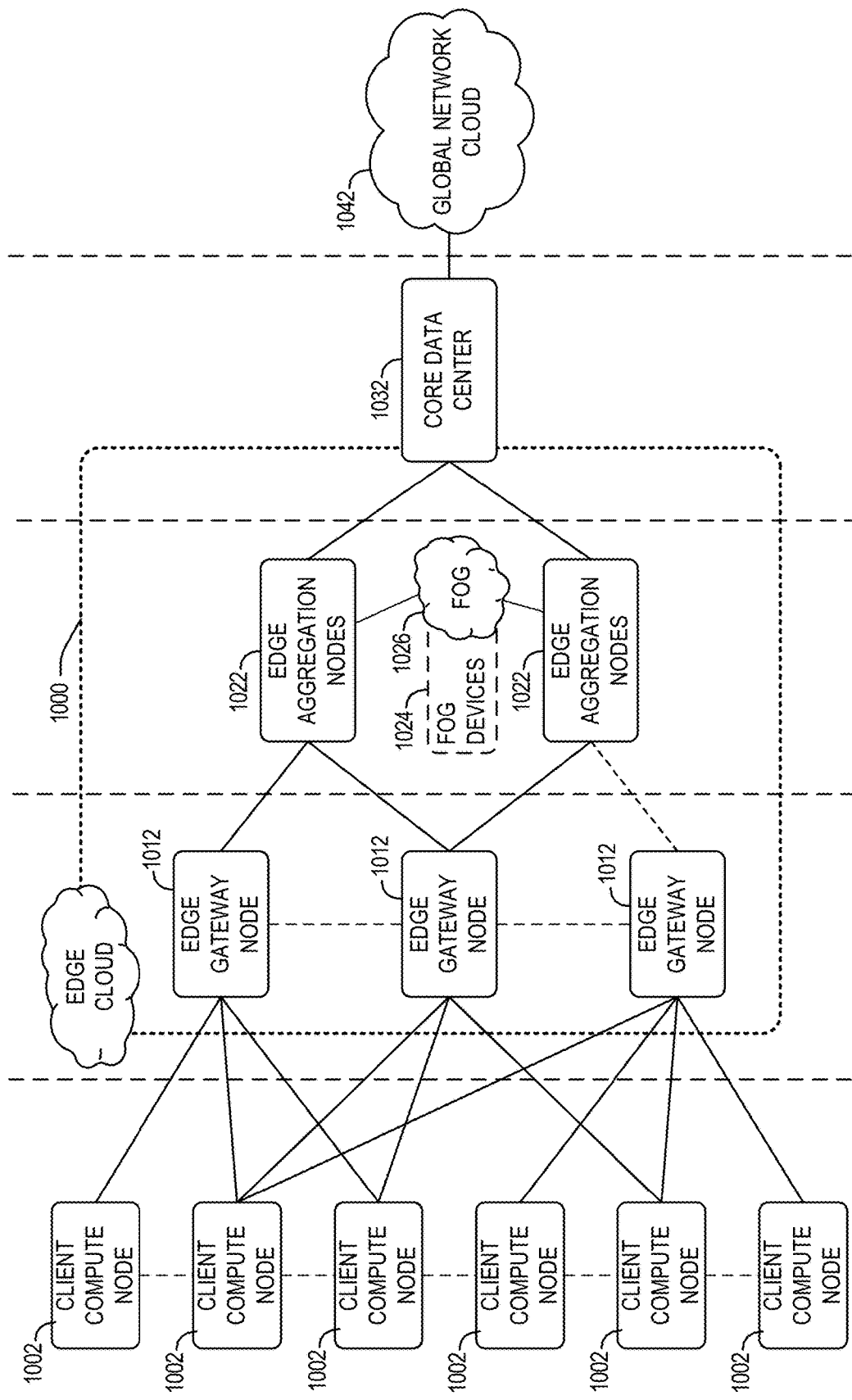
FIG. 10 depicts an example system.

FIG. 10 generically depicts an edge computing system 1000 for providing edge services and applications to multi-stakeholder entities, as distributed among one or more client compute nodes 1002, one or more edge gateway nodes 1012, one or more edge aggregation nodes 1022, one or more core data centers 1032, and a global network cloud 1042, as distributed across layers of the network. The implementation of the edge computing system 1000 may be provided at or on behalf of a telecommunication service provider ("telco", or "TSP"), internet-of-things service provider, cloud service provider (CSP), enterprise entity, or any other number of entities. Various implementations and configurations of the system 1000 may be provided dynamically, such as when orchestrated to meet service objectives.

For example, the client compute nodes 1002 are located at an endpoint layer, while the edge gateway nodes 1012 are located at an edge devices layer (local level) of the edge computing system 1000. Additionally, the edge aggregation nodes 1022 (and/or fog devices 1024, if arranged or operated with or among a fog networking configuration 1026) are located at a network access layer (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement. Fog computing in many scenarios provide a decentralized architecture and serves as an extension to cloud computing by collaborating with one or more edge node devices, providing the subsequent amount of localized control, configuration and management, and much more for end devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 1032 is located at a core network layer (a regional or geographically-central level), while the global network cloud 1042 is located at a cloud data center layer (a national or world-wide layer). The use of "core" is provided as a term for a centralized network location—deeper in the network—which is accessible by multiple edge nodes or components; however, a "core" does not necessarily designate the "center" or the deepest location of the network. Accordingly, the core data center 1032 may be located within, at, or near the edge cloud 1000. Although an illustrative number of client compute nodes 1002, edge gateway nodes 1012, edge aggregation nodes 1022, edge core data centers 1032, global network clouds 1042 are shown in FIG. 10, it should be appreciated that the edge computing system 1000 may include additional devices or systems at each layer. Devices at a layer can be configured as peer nodes to each other and, accordingly, act in a collaborative manner to meet service objectives.

Consistent with the examples provided herein, a client compute node 1002 may be embodied as any type of endpoint component, device, appliance, or other thing capable of communicating as a producer or consumer of data. Further, the label "node" or "device" as used in the edge computing system 1000 does not necessarily mean that such node or device operates in a client or agent/minion/follower role; rather, one or more of the nodes or devices in the edge computing system 1000 refer to individual entities, nodes, or subsystems which include discrete or connected hardware or software configurations to facilitate or use the edge cloud 1000.

As such, the edge cloud 1000 is formed from network components and functional features operated by and within the edge gateway nodes 1012 and the edge aggregation nodes 1022. The edge cloud 1000 may be embodied as any type of network that provides edge computing and/or storage resources which are proximately located to radio access network (RAN) capable endpoint devices (e.g., mobile computing devices, IoT devices, smart devices, etc.), which are shown in FIG. 10 as the client compute nodes 1002. In other words, the edge cloud 1000 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 1000 may form a portion of or otherwise provide an ingress point into or across a fog networking configuration 1026 (e.g., a network of fog devices 1024, not shown in detail), which may be embodied as a system-level horizontal and distributed architecture that distributes resources and services to perform a specific function. For instance, a coordinated and distributed network of fog devices 1024 may perform computing, storage, control, or networking aspects in the context of an IoT system arrangement. Other networked, aggregated, and distributed functions may exist in the edge cloud 1000 between the core data center 1032 and the client endpoints (e.g., client compute nodes 1002). Some of these are discussed in the following sections in the context of network functions or service virtualization, including the use of virtual edges and virtual services which are orchestrated for multiple stakeholders.

As discussed in more detail below, the edge gateway nodes 1012 and the edge aggregation nodes 1022 cooperate to provide various edge services and security to the client compute nodes 1002. Furthermore, because a client compute node 1002 may be stationary or mobile, a respective edge gateway node 1012 may cooperate with other edge gateway devices to propagate presently provided edge services, relevant service data, and security as the corresponding client compute node 1002 moves about a region. To do so, the edge gateway nodes 1012 and/or edge aggregation nodes 1022 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge cloud 1000. In a multi-stakeholder environment, there can be multiple loadable security modules (LSMs) used to provision policies that enforce the stakeholder's interests. Enforcement point environments could support multiple LSMs that apply the combination of loaded LSM policies (e.g., where the most constrained effective policy is applied, such as where if one or more of A, B or C stakeholders restricts access then access is restricted). Within the edge cloud 1000, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

Figure 11:
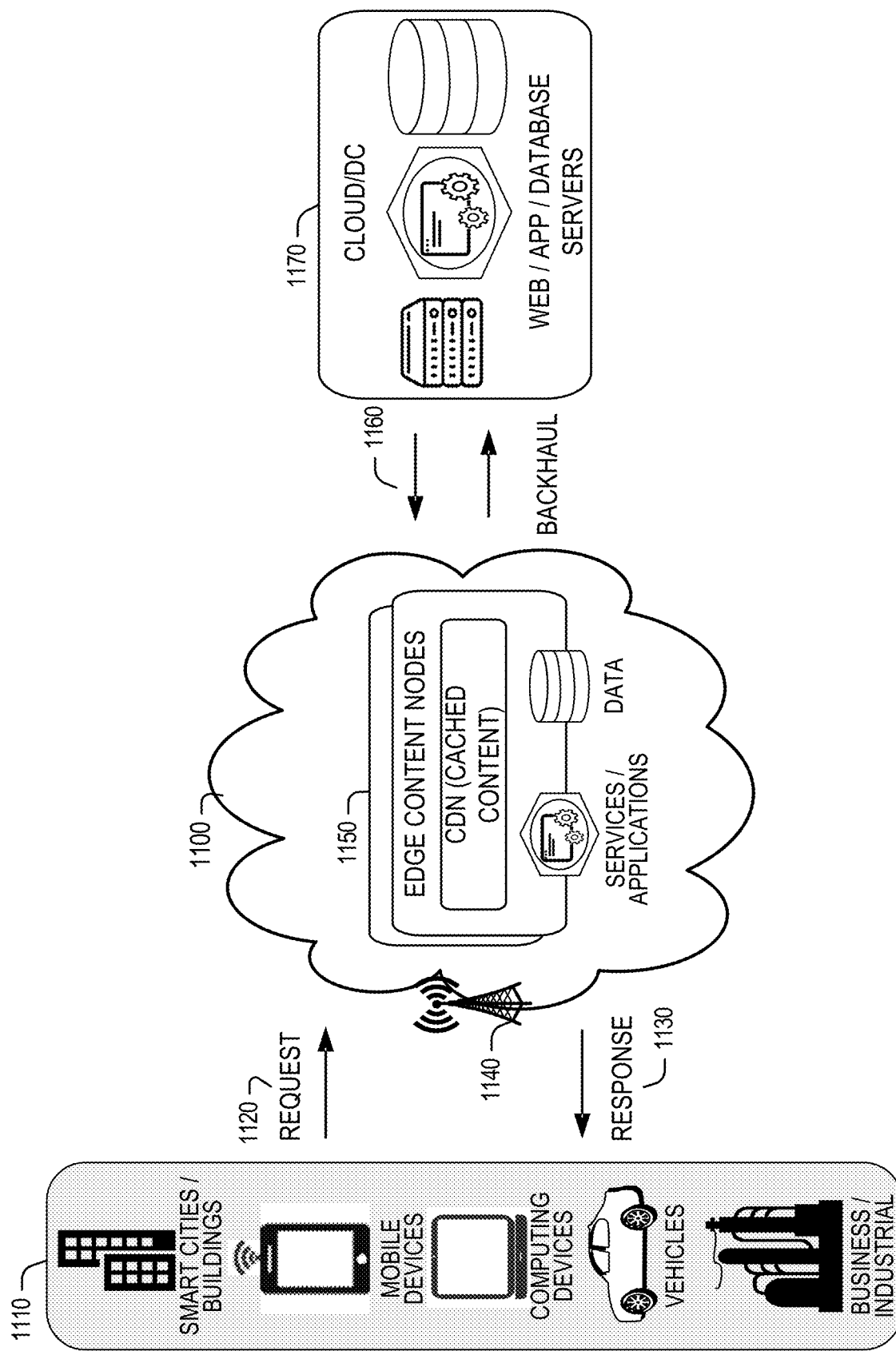
FIG. 11 shows an example system.

FIG. 11 shows an example where various client endpoints 1110 (in the form of mobile devices, computers, autonomous vehicles, business computing equipment, industrial processing equipment) provide requests 1120 for services or data transactions, and receive responses 1130 for the services or data transactions, to and from the edge cloud 1100 (e.g., via a wireless or wired network 1140). Within the edge cloud 1000, the CSP may deploy various compute and storage resources, such as edge content nodes 1150 to provide cached content from a distributed content delivery network. Other available compute and storage resources available on the edge content nodes 1150 may be used to execute other services and fulfill other workloads. The edge content nodes 1150 and other systems of the edge cloud 1000 are connected to a cloud or data center 1170, which uses a backhaul network 1160 to fulfill higher-latency requests from a cloud/data center for websites, applications, database servers, etc.

Various embodiments can be used in any example of FIGS. 1-11 to provide reliable transport of packets between network devices.

Reliable Transport

Various embodiments may implement a reliable transport protocol using at least one AF_XDP queue, at a transmitter network device, for acknowledgement (ACK) receipt and using at least one AF_XDP queue, at a receiver network device, for received packet reordering. AF_XDP queues can be used to implement a data plane for a reliable transport and a kernel socket can provide a control plane. Various embodiments of reliable transport can be used in a service mesh. In some examples, the transmitter and/or receiver network device can include at least one programmable packet processing pipeline in some examples. Various embodiments of a reliable transport protocol may allow support for packet encryption and decryption in at least one programmable packet processing pipeline of a transmitter network device and/or receiver network device (e.g., at least Transport Layer Security (TLS), Internet Protocol Security (IPsec), or Media Access Control security (MACsec)). Various embodiments allow use of features such as receive header splitting from payload and/or layer 2 (L2) tag with packet sequence number insertion or extraction. Various embodiments provide a reliable transport protocol and its implementation using a variety of NICs, IPUs, switches or other network devices.

In some examples, for a packet to be transmitted, a transmit header buffer can be used to provide a transmit header for an application-provided payload and the NIC can perform L2 tag insertion. A driver can insert a packet sequence number in a transmit descriptor for reliable transport. In some examples, the NIC can perform L2 tag extraction for tracking received packet sequence numbers for reliable transport. At a transmitter, an AF_XDP transmit queue can be used for tracking packets to be resent based on received or non-received ACKs. At the transmitter, an AF_XDP queue can be used to identify completed descriptors that are available for reuse by an application.

In some examples, at a receiver, an AF_XDP receive queue can be used for tracking and reordering received packets in order of sequence number. In some examples, for a received packet, a NIC can perform header split to separate a packet header from a packet payload and provide the packet payload to an application, virtual machine, container, or other device or software.

Multiple AF_XDP sockets can be associated with a connection and share a NIC Queue Pair (QP) or utilize a QP for a socket. Various embodiments provide for reliable transport of multiple streams within a connection and support end-to-end encryption. In some examples, a connection can map to a QUIC connection (e.g., client to host). In some examples, various embodiments provide a subset of features of QUIC. In some examples, a stream can include one or more sub-connections from a client to a host. For example, multiple sub-connections can be employed when web browser client accesses several images from a host and a sub-connection is used to retrieve an image. Various embodiments of a reliable transport protocol may allow one stream per connection per packet. Various embodiments of a reliable transport protocol may combine one or more requests with one or more responses in a stream. Various embodiments of a reliable transport protocol may allow utilize a fixed length integer packet size.

Various embodiments provide a socket for control plane and a socket for data plane (e.g., AF_XDP socket). A control plane socket can provide a connection with multiple streams. For example, an AF_XDP socket can support one stream and multiple AF_XDP sockets can be associated with one connection and share Queue Pair (QP) or one QP for each socket. NIC features of receive header split can be used to copy a packet header from payload and provide the payload to an application.

Figure 12A:
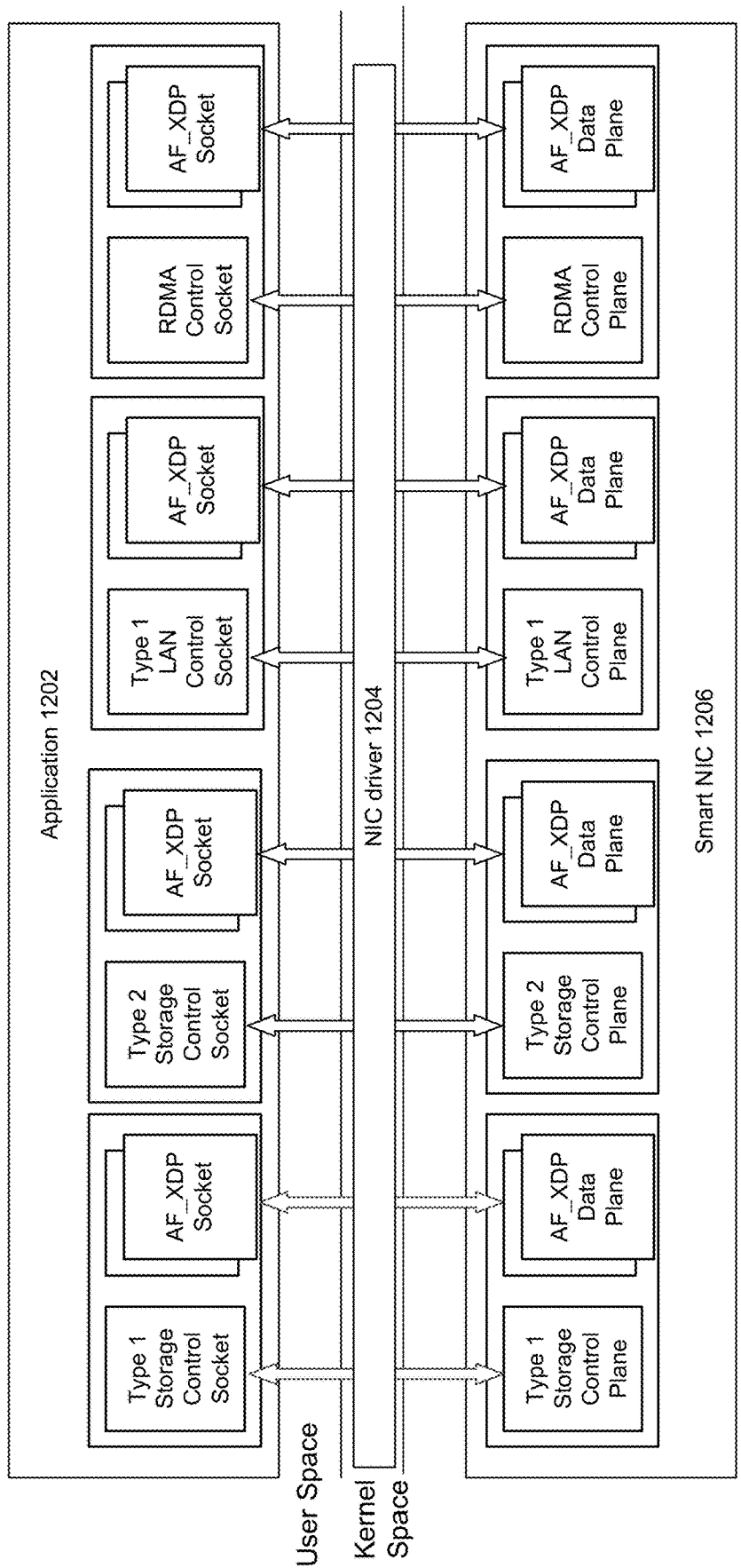
FIGS. 12A-12C depict example systems.

FIG. 12A depicts an example system. The following provides an example of setting up a socket or communication channel between an application 1202 (e.g., application, microservice, container, virtual machine, or other execution environment) with smartNIC (or SmartNIC) 1206. In some examples, smartNIC 1206 includes a control plane executed on a processor of the smartNIC. Application 1202 can create a control socket by calling a NIC driver 1204. Application 1202 can provide configuration parameters to a control plane of smartNIC 1206. Configuration parameters can include a destination IP address for one or more packets that are to be transmitted at the request of application 1202. NIC driver 1204 can use a PCIe base address register (BAR) or memory-mapped I/O (MMIO) to send configuration parameters to smartNIC 1206 to configure smartNIC 1206. Configuration parameters can be the same or different for storage, local area network (LAN) and remote direct memory access (RDMA) communications using smartNIC 1206.

Application 1202 can request NIC driver 1204 to create an AF_XDP socket. In some examples, NIC driver 1204 can communicate with a control plane in smartNIC 1206 to configure the AF_XDP socket to allow application 1202 to communicate using AF_XDP queues. Application 1202 can identify a network packet payload to smartNIC 1206 directly using a descriptor in an AF_XDP queue, provide a storage packet payload (e.g., using a DMA copy operation) or send remote direct memory access (RDMA) packet payload.

Figure 12B:
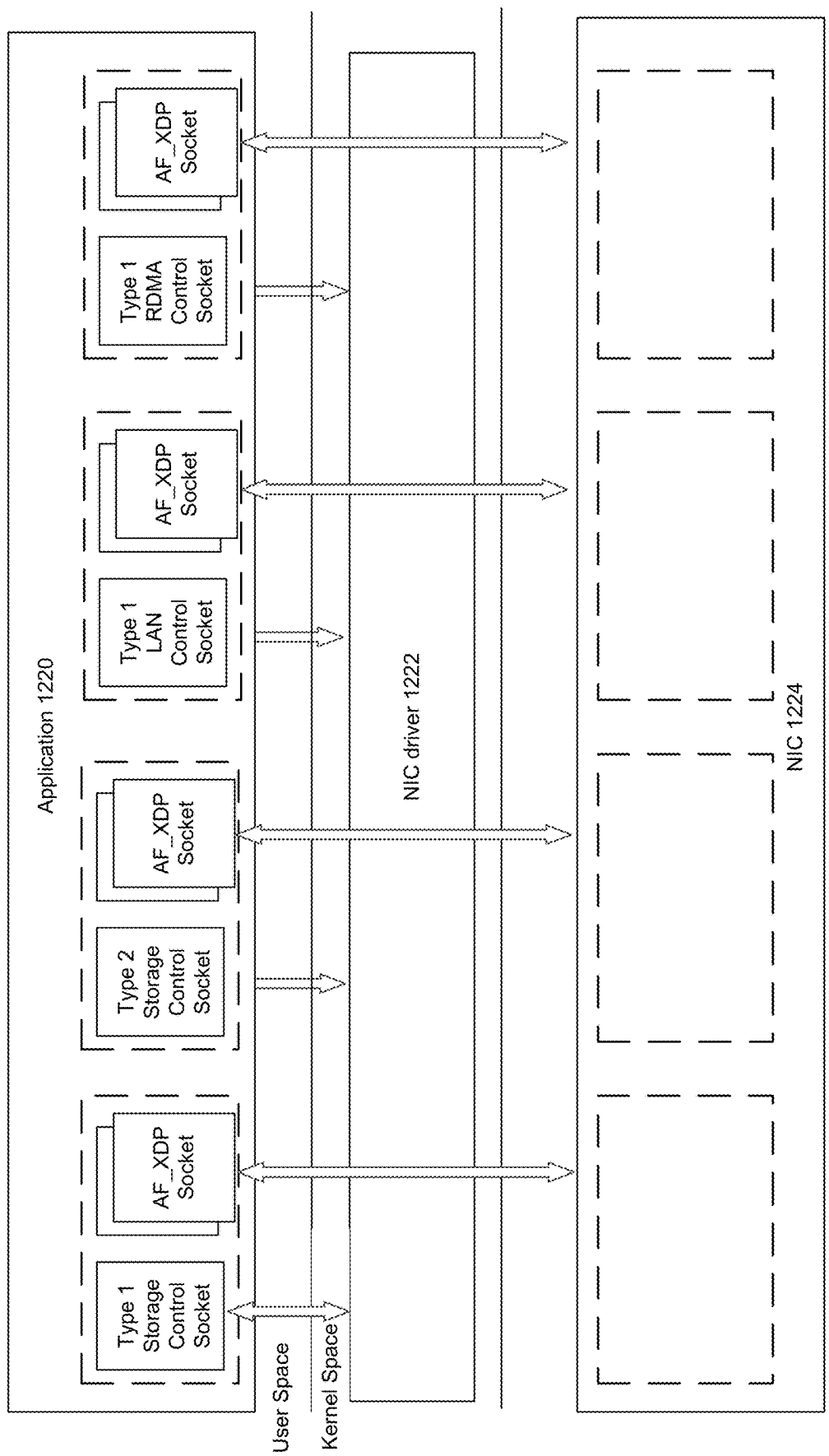

FIG. 12B depicts an example system. The following provides an example of setting up a socket or communication channel between an application 1220 (e.g., application, microservice, container, virtual machine, or other execution environment) with NIC 1224 where NIC 1224 does not include a control plane. Application 1220 can create a control socket by calling NIC driver 1222. Application 1220 can provide configuration parameters to a control plane. In some examples, configuration parameters can include a destination IP address of one or more packets. NIC driver 1222 can use PCIe BAR or MMIO to send configuration parameters to NIC 1224 to configure NIC 1224. Configuration parameters can be the same or different for storage, LAN and RDMA communications.

Application 1220 can request NIC driver 1222 to create an AF_XDP socket. NIC driver 1222 can set up a control plane of NIC 1224 in kernel space to configure AF_XDP to allow application 1220 to communicate using AF_XDP queues. NIC driver 1222 can communicate with NIC 1224 to allow control plane configuration of NIC 1224. NIC 1224 can communicate with the control plane in kernel space through interrupts, for example. Application 1220 can identify a network packet payload to NIC 1224 directly using a descriptor in an AF_XDP queue, provide a storage packet payload (e.g., using a DMA copy operation) or send remote direct memory access (RDMA) packet payload.

For example, an operating system (OS) can separate memory or virtual memory into kernel space and user space to provide memory protection and hardware protection from malicious or errant software behavior. User space can be memory allocated to running applications and some drivers. Processes running under user space may have access to a limited part of memory, whereas the kernel may have access to all of the memory. Kernel space can be memory allocated to the kernel, kernel extensions, some device drivers and the operating system. A kernel can manage applications running in user space. Kernel space can be a location where the code of the kernel is stored and executes within.

Figure 12C:
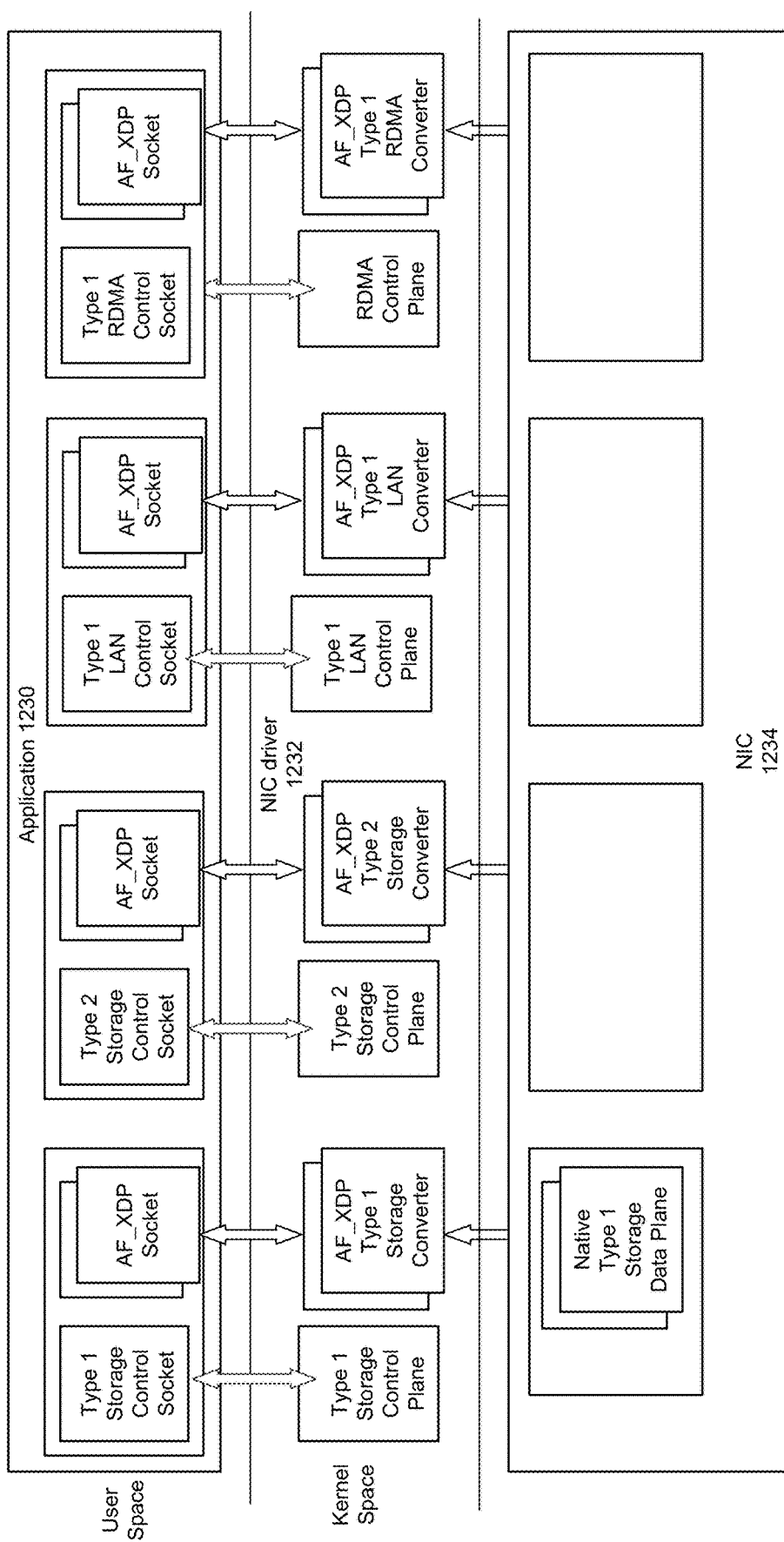

FIG. 12C depicts an example system. In some examples, NIC 1234 does not support communication with a host system using an AF_XDP socket. In some examples, a control plane for a NIC can be executed in kernel space. AF_XDP converters can be executed in kernel space to act as an intermediary between an AF_XDP socket in user space and data plane of NIC 1234.

While examples are described with respect to NICs, embodiments can be utilized to provide reliable transport between other network devices such as IPUs, switches, routers, forwarding elements, and so forth.

Figure 13A:
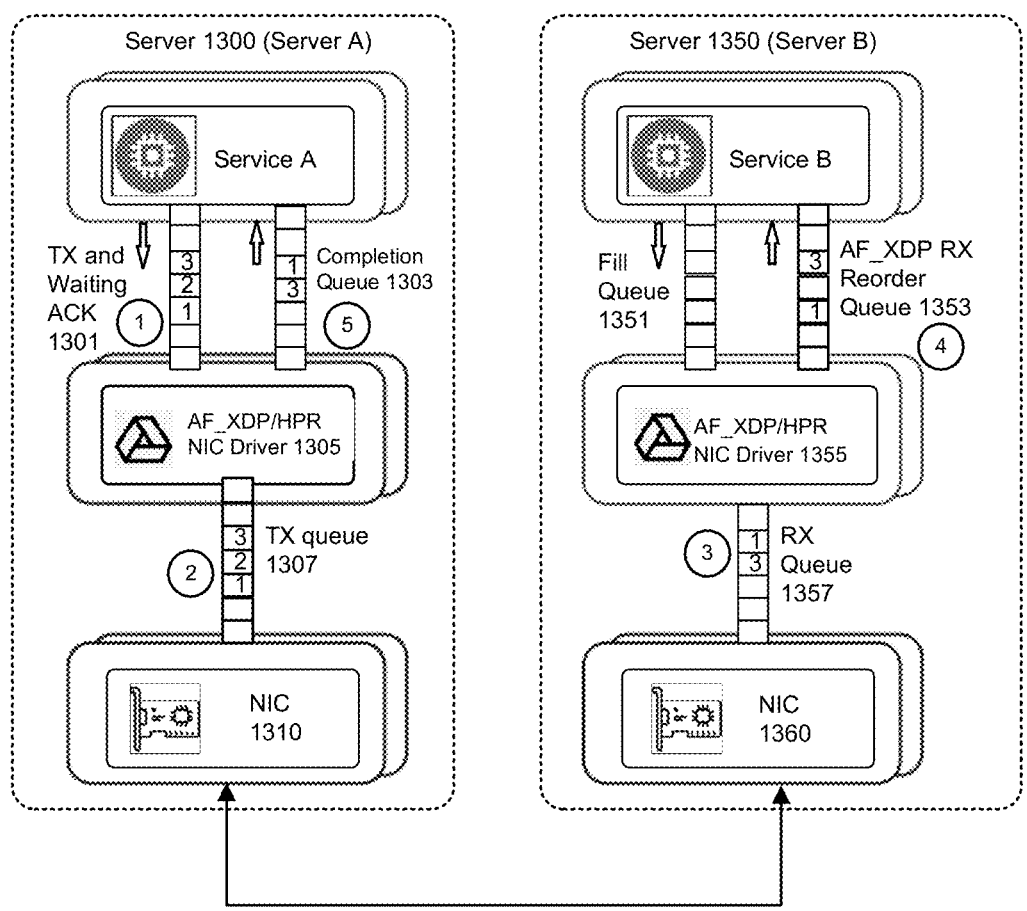
FIGS. 13A and 13B shows an example sequence of operations of a system.
Figure 13B:
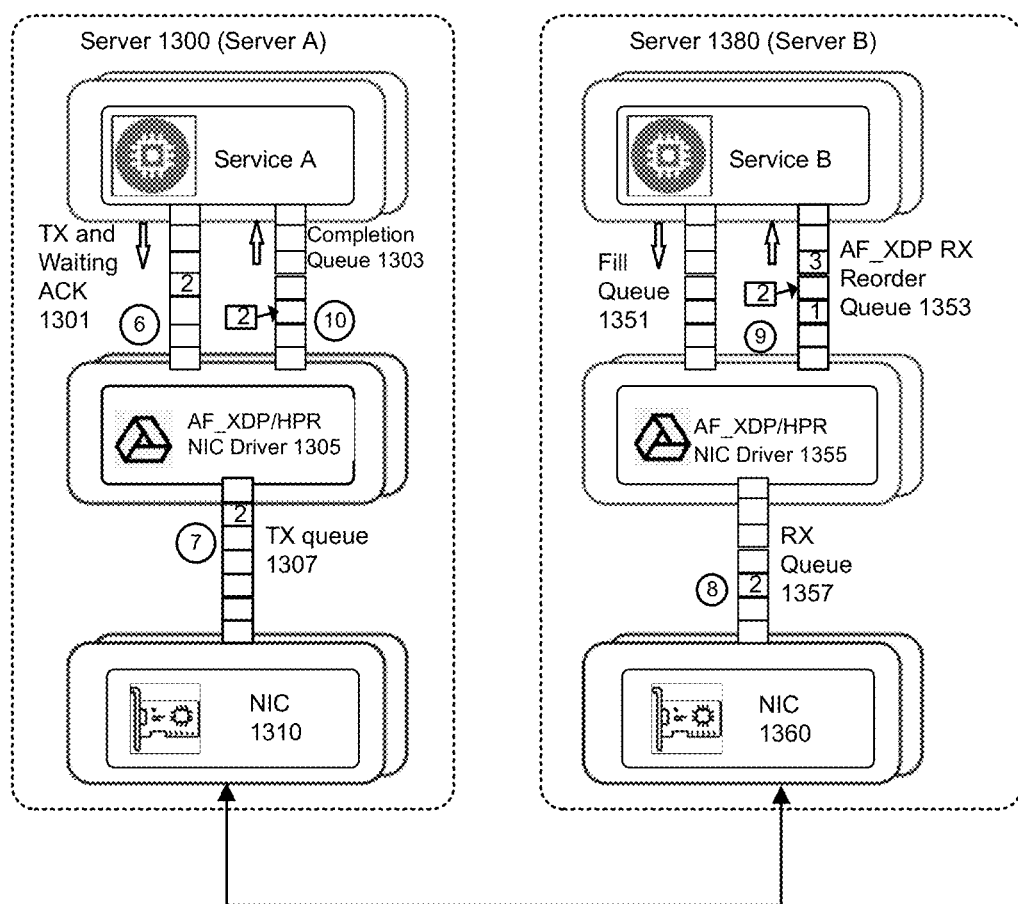

FIGS. 13A and 13B show an example sequence of operations in a system. The examples depict use of a single AF_XDP socket to transport content of a sub-connection or stream but multiple AF_XDP sockets can be used to transport content of multiple sub-connections or streams. The examples show transmission of packets from server 1300 (Server A) to server 1350 (Server B). For transmission of packets from Server B to Server A, similar technologies can be used by Server B as those used by Server A to transmit packets.

In some examples, server 1300 (server A) sends three packets (packets 1-3) to server 1350 (server B) but packet 2 is not received by server B and server A resends packet 2. For example, service A executing on server A can include a container, virtual machine, application, microservice, or a device. NIC driver 1305 can provide Service A with access to NIC 1310. NIC driver 1305, in some examples, can provide AF_XDP and high performance reliable (HPR) support. AF_XDP can be used for data plane communications whereas HPR can be used for control plane communications. An HPR socket can be used for creating a connection which includes one or more streams, where a stream can include an AF_XDP socket at one or both ends of the communication (e.g., sender and/or receiver).

Service A can utilize an AF_XDP queue to identify a payload in user space for access by NIC 1310. AF_XDP queues can allow for passing payloads to be accessible in user space and kernel space so that a copy from memory accessible to user space to a memory accessible kernel space can be avoided. In other words, a user space buffer in memory can be accessed by posting to a kernel space queue or a kernel space buffer in memory can be accessed by posting to a user space queue. In some examples, a Linux unified/user-space access intended accelerator framework (UACCE) can be used in addition or alternative to AF_XDP. AF_XDP queues can be used to post a message (e.g., descriptor) without copying a message into kernel space for access by a driver. At (1), service A can identify L7 information (e.g., data) by identification of the information (e.g., buffer location) in a descriptor posted to an AF_XDP queue (e.g., TX and waiting ACK queue 1301) in user space but not provide a header (e.g., TCP or IP header).

In some examples, a Connection ID (e.g., UDP transmit port and destination IP address) has associated header fields in kernel space. Packet header fields for payloads can be selected in kernel space by a protocol processing stack or driver 1305 based on a particular connection identifier. Header fields can be associated with an AF_XDP queue and the header fields to be added to a packet header can be based on what AF_XDP queue transfers a packet payload. In some examples, AF_XDP/HPR driver 1305 can update a packet sequence number in a descriptor for a payload based on an AF_XDP queue used to transfer a TX descriptor for the payload. Various examples of descriptor content, including header fields, that can be provided by driver 1305 to NIC 1310 are described for example, at least with respect to L2TAG1 described in Intel® Ethernet Adaptive Virtual Function (AVF) Specification or similar descriptors. In some examples, driver 1305 can update L2TAG1 or another field to a convey a packet sequence number for a payload.

In some examples, a packet sequence number can use one field in a list that is 16 bits which could be dynamically changed without affecting performance. A largest packet sequence number [0xfff0~0xffff] could be reserved for special purpose, e.g., 0xfff0 for in-band ACK packet.

In this example, at (2), a descriptor received via TX queue 1307 can instruct NIC 1310 to add header fields to headers of packets 1-3. Server A can identify payloads for packets 1-3 to transmit to NIC 1310 using TX queue 1307 (e.g., a transmit descriptor queue). At Server A, NIC 1310 can add a header to payloads from Service A for packets 1-3, with distinct packet sequence numbers 1-3 conveyed in packet headers, and transmit packets 1-3 to NIC 1360 of Server B.

NIC 1310 can utilize direct memory access (DMA) to access a copy a payload and header. NIC 1310 can utilize large segmentation offload (LSO) and header split to access header and payloads separately. NIC 1310 can form packets based on an applicable maximum transmission unit (MTU) size and can use a same header fields (but with different sequence numbers) to transmit packets 1-3. In NIC 1310, cryptography circuitry can be used to encrypt or decrypt packets (e.g., TLS, IPSec, or MACSec). In some examples, NIC 1310 can utilize a programmable data plane to perform packet encryption or decryption. An HPR socket of driver 1305 if server A can setup a secure connection with handshake with peer HPR socket of driver 1355 of server B and negotiate a security key for AF_XDP socket to encrypt/decrypt packets. Other reliability solutions such as Forward Error Correction could be implemented at transmitter and/or receiver.

Packets 1-3 can be transmitted using UDP, Ethernet, or other protocols. Various embodiments can use an address mapping for a connection (e.g. 192.168.3.3 UDP port 447 is mapped to MAC address 3c:fd:fe:b8:96:29), and driver 1305 can use this MAC address to perform connection management directly without the application identifying the difference.

At Server B, NIC 1360 can process Ethernet header, IP header, UDP header and other header fields and NIC 1360 can provide payloads of received packets to a buffer for access by service B using RX queue 1357). In some examples, NIC 1360 can perform RX header split to separately copy a packet header and packet payload to different memory destinations. In this example, packets 1 and 3 are received at server 1350 (server B) but packet 2 is not received by Server B. In some examples, AF_XDP driver 1355 can convert a receive descriptor format for access by Service B. At (4), at server B, AF_XDP/HPR driver 1355 can indicate packets 1 and 3 were received by descriptors for packets 1 and 3 in AF_XDP reorder queue 1353 with an empty slot for a descriptor for packet 2. In some examples, packet reordering can be performed using receive descriptors in AF_XDP reorder queue 1353.

Driver 1355 for server B can cause transmission of receipt acknowledgement (ACK) to server A to indicate packets 1 and 3 were received. Server A receives ACKs for packets 1 and 3 and, at (5), releases descriptors for packets 1 and 3 from completion queue 1303. Completion queue 1303 can be used to transfer completed descriptors from driver 1305 to service A.

Referring to FIG. 13B, at (6), TX and waiting ACK queue can identify packet 2 to be resent and packet 2 is resent at (7). After receipt of resent packet 2, at (8), RX queue 1357 can be updated to indicate a descriptor that indicates receipt of packet 2. At (9), Server B can place an RX descriptor for resent packet 2 in an empty slot reserved for packet 2 in AF_XDP RX reorder queue 1353. For example, Service B can use AF_XDP reorder queue 1353 to provide descriptors of payload of packets 1-3 for access by Service B. A Fill Queue can be used by service B to transfer descriptors that identify available buffers to store received packets to driver 1355. NIC 1360 can post the headers for packets 1-3 to kernel space and post payloads for packets 1-3 to user space for access by Service B.

In some examples, flow control and ACK can utilize credit-based flow-control scheme, where a current credit number is an empty descriptor number left in RX ring and credits already used. A driver can advertise this credit when tail/header change for RX ring. Credits could be used for allocation to ACK packets.

In some examples, connection management messages can be sent from transmitter to receiver or receiver to transmitter using UDP packets through a kernel stack.

Some embodiments relate to uses of NICs and a service mesh as an example target, but embodiments are not limited thereto. Various embodiments can apply to all NICs that can support RX header split, TX header buffer, queue steering, and/or packet sequence number insertion or extraction. Other NICs may dynamically insert a packet number to packet's other fields (e.g. IP header or a VLAN Tag). Various embodiments may utilize various protocols, e.g., NVMe over Fabrics (NVMe-oF), NVMe over RDMA over Converged Ethernet (ROCE), NVMe over iWARP, or NVMe over TCP. In some examples, reliability features described herein can be executed on one or more processors of a SmartNIC.

Various embodiments may utilize in-network telemetry (INT) to encapsulate end-to-end tags such in a UDP encapsulation. INT is a framework designed to allow the collection and reporting of network device state. INT information can be encapsulated in a UDP header. In some embodiments, a packet number can be conveyed information in INT information. A rule can be configured in a programmable data plane of a switch to copy a packet number from a VLAN tag to UDP encapsulation in the transmit side, and restore the packet number from UDP encapsulation to VLAN tag in the receive side.

Figure 14:
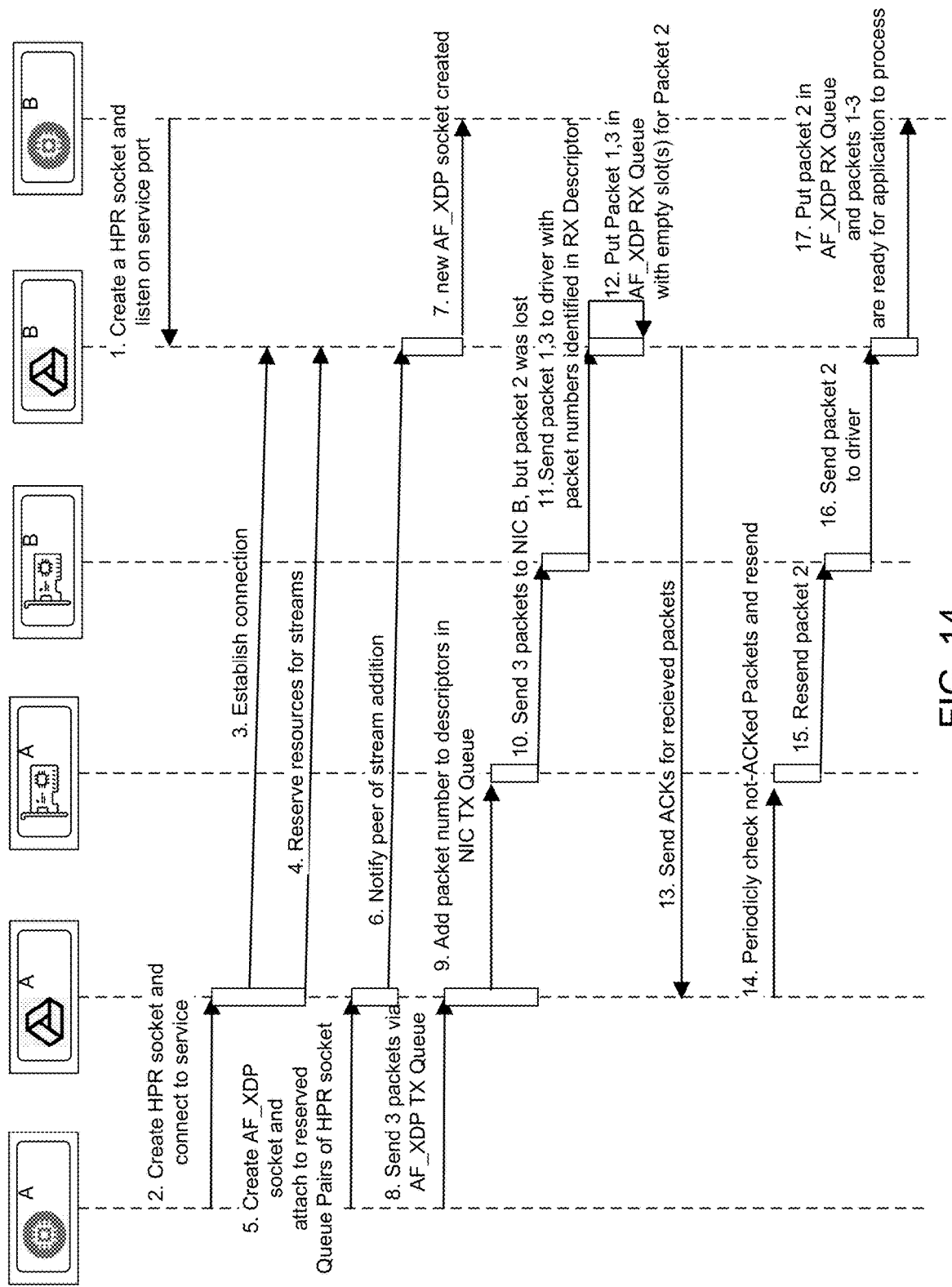
FIG. 14 is a sequence diagram for a connection and stream establishment and packet transmission and re-transmission.

FIG. 14 is a sequence diagram for a connection and stream establishment and packet transmission and re-transmission. Connection creation between two network devices can occur in actions 1-4. At action 1, service B can create an HPR socket and listen on a service port (e.g., IP address 192.168.3.3 and UDP port 443). At action 2, service A can create an HPR socket and connect to a same service port as that of service B (IP address 192.168.3.3 and UDP port 443). At action 3, a driver for a network device accessible to service A can establish a connection with peer driver for service B to set security parameters for communications between service A and service B. At action 4, a driver for the network device accessible to service A can reserve resources for a default number of streams or sub-connections. Action 4 can include reserving resources including one or more Queue Pair (QP) per connection, and related Queue Steering settings in place, e.g. 5-tuples-based UDP Steering to each Queue Pair using NIC hardware filters. For example, a queue pair (e.g., 4 queues) can include, at transmit side, a TX and waiting ACK queue, completion queue as well as, at receive side, a fill queue and AF_XDP RX reorder.

Stream creation between service A and service B can occur in actions 5-7. At action 5, service A can use a kernel application program interface (API) to create an AF_XDP socket and attach reserved queue pairs of an HPR socket. At action 6, a driver for the network device accessible to service A can notify a peer driver for the network device accessible to service B that a stream has been added. The stream can be mapped to an AF_XDP socket. At action 7, the driver for the network device accessible to service B can create a peer AF_XDP socket for service B.

An example of packet transmissions to provide content from service A to service B can occur in actions 8-12. At action 8, service A sends packets 1-3 via an AF_XDP TX queue (e.g., TX and waiting ACK queue). At action 9, a driver for the network device accessible to service A can update packet sequence numbers in descriptors. For example, packet sequence numbers can be included in TX descriptors. In action 9, a driver can add packet header information to TX descriptors (e.g., Ethernet, IP destination address, UDP source port, or other fields) and optionally a Stream ID as an inner VLAN ID. A NIC may use two descriptors for a packet, namely, a packet for a fixed header (with different packet sequence numbers) and a descriptor for dynamic packet payload passed from service A. A header buffer may be allocated by service A and passed to an HPR socket so it could share the same input-output memory management unit (IOMMU) security (e.g. PASID) via a payload buffer.

At action 10, a NIC used by service A can send packets to a NIC used by service B. In this example, packet 2 was not received by the NIC used by service B. At action 11, the NIC used by service B can identify received packets 1 and 3 to driver for service B with received packet sequence number in an RX descriptor. At action 12, driver for NIC B can place payloads of packets 1 and 3 in an AF_XDP RX queue with an empty slot for packet 2 (e.g., AF_XDP RX reorder queue). At action 12, as multiple AF_XDP sockets (streams) may share a NIC queue pair (QP) (connection), if a stream number is larger than available hardware QP, NIC driver can determine an appropriate AF_XDP RX reorder queue to associate with the received packet by inspection of an inner VLAN ID (e.g., Stream ID) in packet header or based on an RX descriptor. Otherwise, if a NIC QP maps to one AF_XDP socket, a stream may have different n-tuples for queue steering.

Packet acknowledgement and resend can occur in actions 13-17. At action 13, NIC B can send one or more ACKs to NIC A for packets 1 and 3. ACK messages could be sent in-band as a special packet in a stream, or as part of connection management messages. Various embodiments could utilize selective ACK implemented in an intermediate layer (IL) in NIC AF_XDP driver or in a NIC, and not in user space. At action 14, driver for NIC A can check for one or more packets for which an ACK was not received. At action 15, a driver for NIC A can cause NIC A to resend packet 2 as an ACK was not received for packet 2. At action 16, packet 2 is provided to driver for NIC B. At action 17, NIC B provides transfer a descriptor for packet 2 using an AF_XDP queue and packets 1-3 are ready for service B to process. In other examples, packet payloads may be provided one at a time for processing by service B instead of in a batch.

Figure 15A:
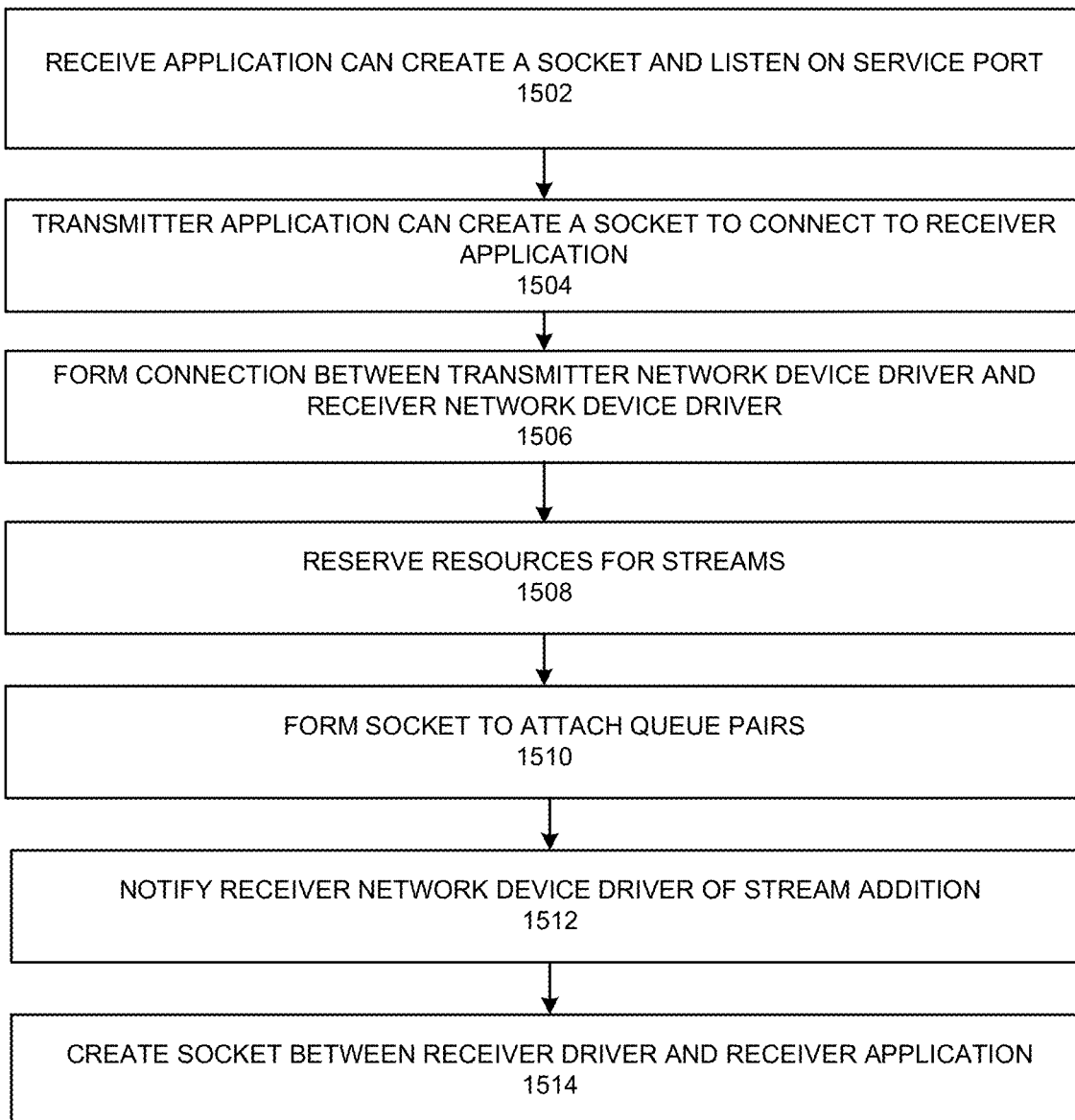
FIGS. 15A-15C depict example processes.

FIG. 15A depicts an example configuration process. At 1502, receiver application can create a socket and listen on a service port. For example, a socket can be created and connected to a sender application (e.g., service) and a receiver application (e.g., service) can create the socket and listen on a particular service port. At 1504, a transmitter application can create a socket to connect to the receiver application. At 1506, a connection can be formed between the transmitter network device driver and receiver network device driver. A connection can include an AF_XDP socket as described herein. At 1508, resources can be reserved for streams by the transmitter and receiver drivers. Resources can include AF_XDP transmit and receive queues as described herein. At 1510, a socket can be formed to attach to queue pairs to the socket. For example, an AF_XDP socket can be created and attached to reserved queue pairs of an HPR socket. At 1512, a receiver network device driver can be notified of a stream addition. At 1514, a socket can be created at the receiver between the receiver driver and receiver application. For example, an AF_XDP socket can be created at the receiver.

Figure 15B:
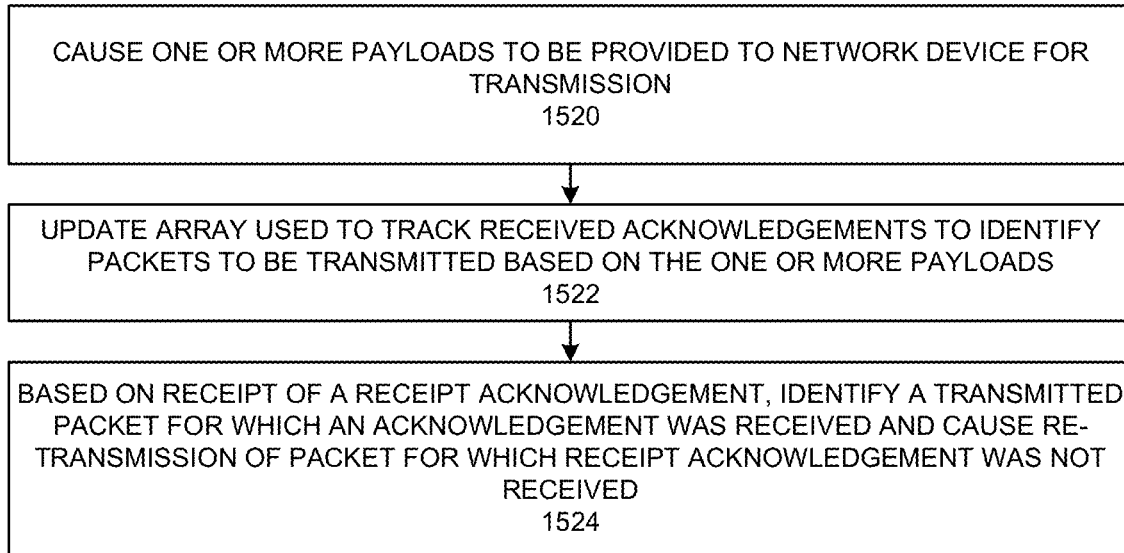

FIG. 15B depicts an example packet transmission and re-transmission process. At 1520, a transmitter application can cause one or more payloads to be sent via packets to a receiver network device. The receiver system and network device can be configured with a connection to the transmitter device using the process of FIG. 15A. At 1520, the transmitter application can cause the one or more payloads to be transferred using a transmit queue. In some examples, the transmit queue is a transmit and ACK receive AF_XDP queue. At 1522, a driver for the transmitter network device can update a waiting-ACK array to indicate packets to be transmitted that are associated with the one or more payloads await receipt of an ACK. In some examples, the waiting-ACK array can be implemented using an AF_XDP queue. The driver can include packet sequence numbers of the packets to be transmitted that are associated with the one or more payloads to a transmit queue. In some examples, the transmit queue can be a transmit descriptor queue. At 1524, the driver of the transmitter network device can identify a transmitted packet for which an ACK was not received, and cause re-transmission of a packet for which an ACK was not received. For example, an AF_XDP-based completion queue can be used to indicate descriptors for which ACKs have been received. Packets to be resent can be identified from the waiting-ACK array.

Figure 15C:
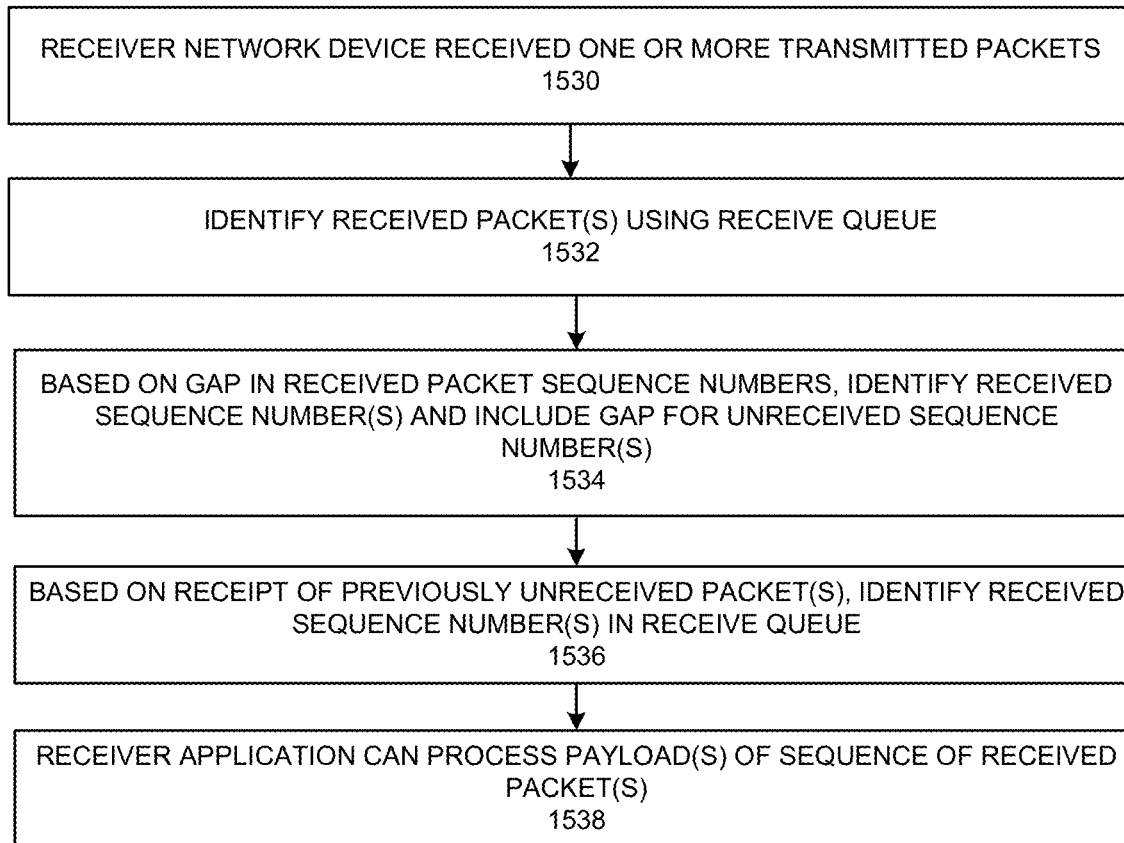

FIG. 15C depicts an example packet receipt process. A receiver system and network device can be configured with a connection to the transmitter device using the process of FIG. 15A. At 1530, the receiver network device can receive one or more packets. At 1532, the receiver network device can identify received packets using a receive queue. For example, received packet(s) can be identified to a driver using a receive descriptor queue. At 1534, based on a gap in received packet sequence numbers, the driver can identify received sequence number(s) and leave gap(s) in a queue for unreceived sequence number(s). For example, descriptors for received packet sequence numbers can be placed in an AF_XDP queue with a gap for non-received packet sequence numbers. At 1536, based on receipt of a packet with a previously unreceived sequence number, the receiver driver can identify the received packet in the receive descriptor queue and the AF_XDP queue that identifies unreceived sequence number(s). At 1538, the receive application can process payloads of a sequence of one or more received packets.

Figure 16:
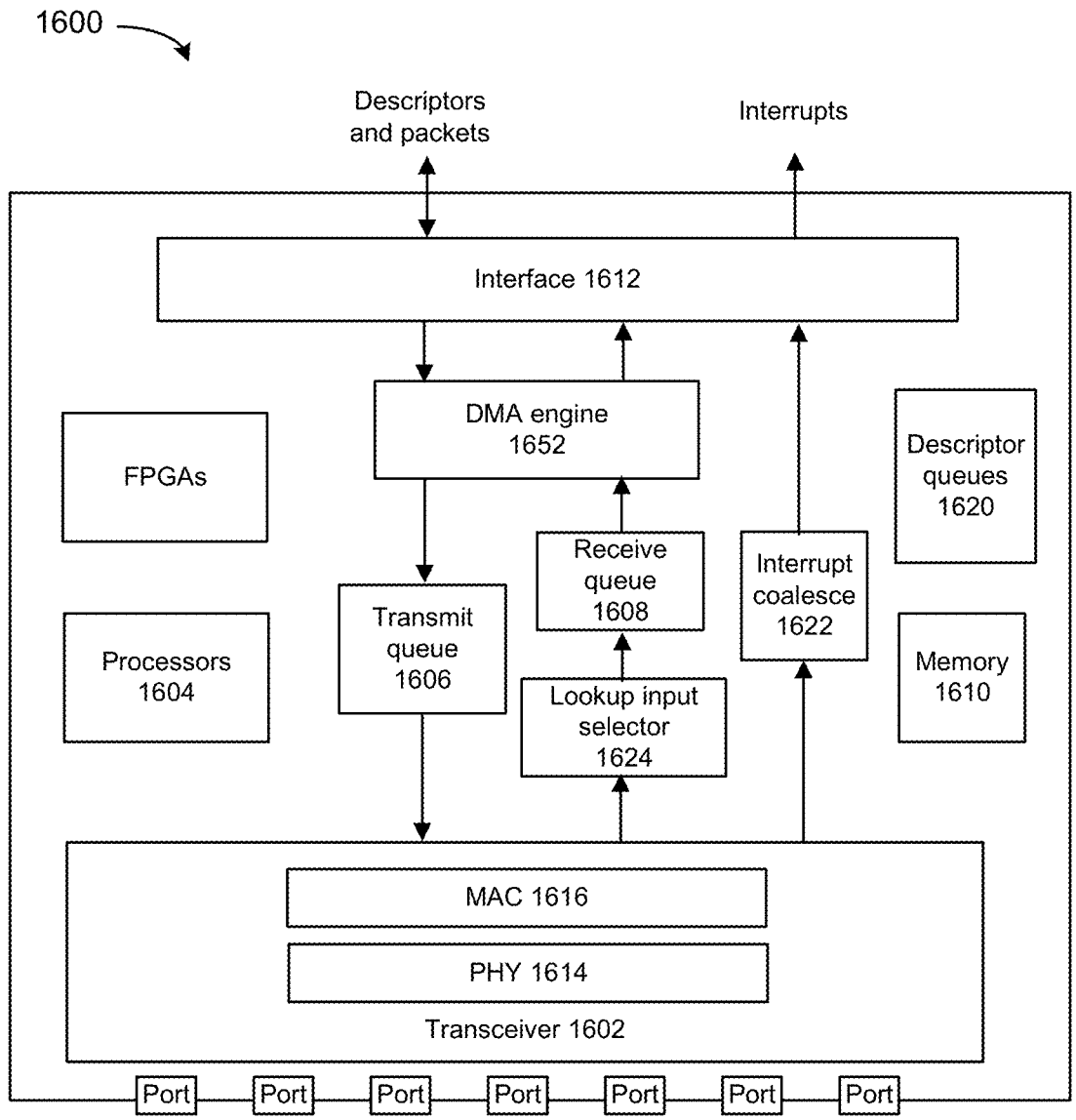
FIG. 16 depicts an example network device.

FIG. 16 depicts a network interface that can use embodiments or be used by embodiments. Various resources in processor resources and the network interface can perform packet transmission and receipt using a reliable transport protocol in accordance with embodiments described herein. In some examples, network interface 1600 can be implemented as a network interface controller, network interface card, a host fabric interface (HFI), or host bus adapter (HBA), and such examples can be interchangeable. Network interface 1600 can be coupled to one or more servers using a bus, PCIe, CXL, or DDR. Network interface 1600 may be embodied as part of a system-on-a-chip (SoC) that includes one or more processors, or included on a multichip package that also contains one or more processors.

Some examples of network device 1600 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 1600 can include transceiver 1602, processors 1604, transmit queue 1606, receive queue 1608, memory 1610, and bus interface 1612, and DMA engine 1652. Transceiver 1602 can be capable of receiving and transmitting packets in conformance with the applicable protocols such as Ethernet as described in IEEE 802.3, although other protocols may be used. Transceiver 1602 can receive and transmit packets from and to a network via a network medium (not depicted). Transceiver 1602 can include PHY circuitry 1614 and media access control (MAC) circuitry 1616. PHY circuitry 1614 can include encoding and decoding circuitry (not shown) to encode and decode data packets according to applicable physical layer specifications or standards. MAC circuitry 1616 can be configured to perform MAC address filtering on received packets, process MAC headers of received packets by verifying data integrity, remove preambles and padding, and provide packet content for processing by higher layers. MAC circuitry 1616 can be configured to assemble data to be transmitted into packets, that include destination and source addresses along with network control information and error detection hash values.

Processors 1604 can be any a combination of a: processor, core, graphics processing unit (GPU), field programmable gate array (FPGA), application specific integrated circuit (ASIC), or other programmable hardware device that allow programming of network interface 1600. For example, processors 1604 can provide for identification of a resource to use to perform a workload and generation of a bitstream for execution on the selected resource. For example, a "smart network interface" can provide packet processing capabilities in the network interface using processors 1604.

Packet allocator 1624 can provide distribution of received packets for processing by multiple CPUs or cores using timeslot allocation described herein or RSS. When packet allocator 1624 uses RSS, packet allocator 1624 can calculate a hash or make another determination based on contents of a received packet to determine which CPU or core is to process a packet.

Interrupt coalesce 1622 can perform interrupt moderation whereby network interface interrupt coalesce 1622 waits for multiple packets to arrive, or for a time-out to expire, before generating an interrupt to host system to process received packet(s). Receive Segment Coalescing (RSC) can be performed by network interface 1600 whereby portions of incoming packets are combined into segments of a packet. Network interface 1600 provides this coalesced packet to an application.

Direct memory access (DMA) engine 1652 can copy a packet header, packet payload, and/or descriptor directly from host memory to the network interface or vice versa, instead of copying the packet to an intermediate buffer at the host and then using another copy operation from the intermediate buffer to the destination buffer.

Memory 1610 can be any type of volatile or non-volatile memory device and can store any queue or instructions used to program network interface 1600. Transmit queue 1606 can include data or references to data for transmission by network interface. Receive queue 1608 can include data or references to data that was received by network interface from a network. Descriptor queues 1620 can include descriptors that reference data or packets in transmit queue 1606 or receive queue 1608. Bus interface 1612 can provide an interface with host device (not depicted). For example, bus interface 1612 can be compatible with PCI, PCI Express, PCI-x, Serial ATA, and/or USB compatible interface (although other interconnection standards may be used).

Figure 17:
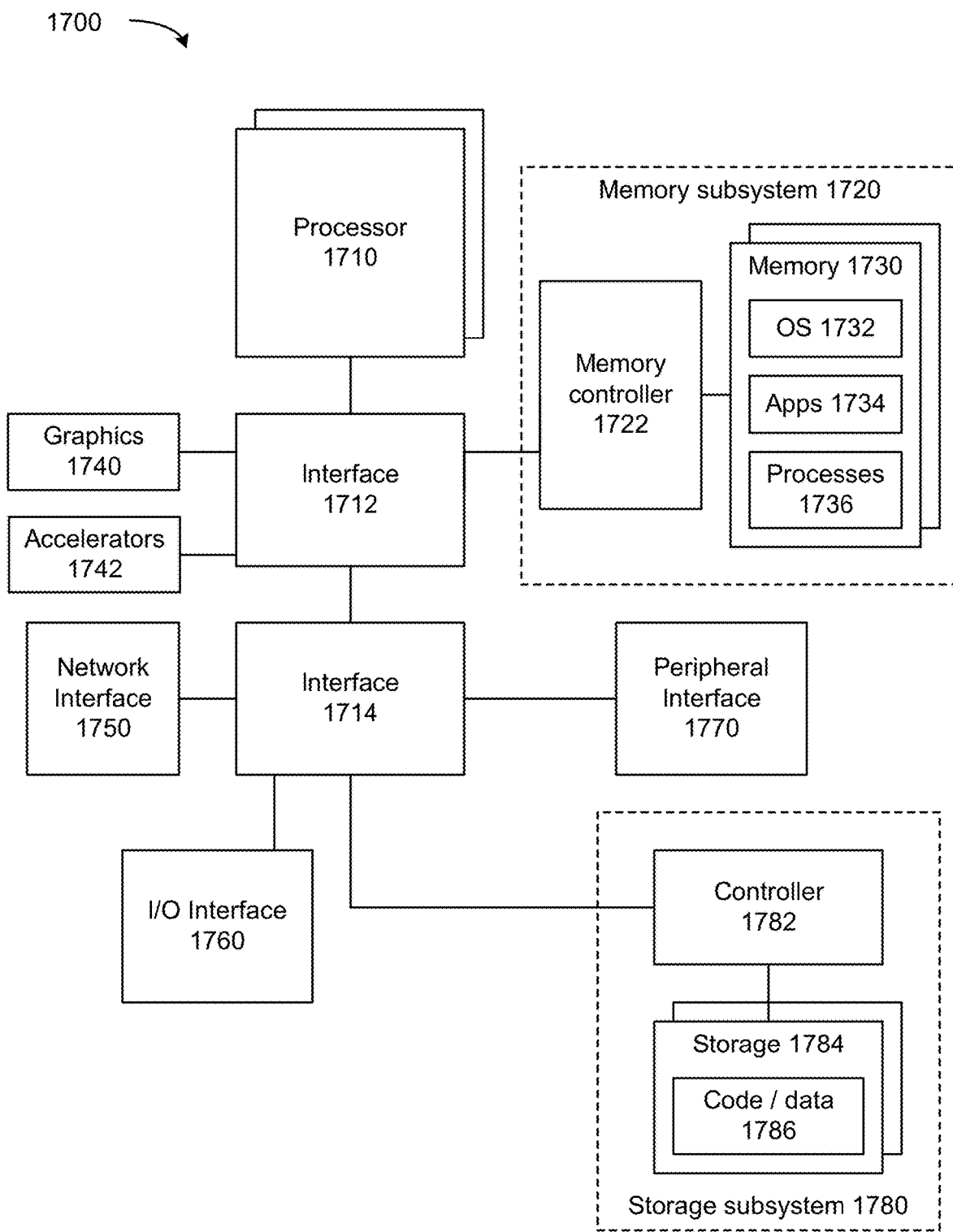
FIG. 17 depicts an example system.

FIG. 17 depicts an example computing system. Various embodiments can be used by system 1700 to perform packet transmission and receipt using a reliable transport protocol in accordance with embodiments described herein. System 1700 includes processor 1710, which provides processing, operation management, and execution of instructions for system 1700. Processor 1710 can include any type of microprocessor, central processing unit (CPU), graphics processing unit (GPU), processing core, or other processing hardware to provide processing for system 1700, or a combination of processors. Processor 1710 controls the overall operation of system 1700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1700 includes interface 1712 coupled to processor 1710, which can represent a higher speed interface or a high throughput interface for system components that needs higher bandwidth connections, such as memory subsystem 1720 or graphics interface components 1740, or accelerators 1742. Interface 1712 represents an interface circuit, which can be a standalone component or integrated onto a processor die. Where present, graphics interface 1740 interfaces to graphics components for providing a visual display to a user of system 1700. In one example, graphics interface 1740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1740 generates a display based on data stored in memory 1730 or based on operations executed by processor 1710 or both. In one example, graphics interface 1740 generates a display based on data stored in memory 1730 or based on operations executed by processor 1710 or both.

Accelerators 1742 can be a fixed function or programmable offload engine that can be accessed or used by a processor 1710. For example, an accelerator among accelerators 1742 can provide compression (DC) capability, cryptography services such as public key encryption (PKE), cipher, hash/authentication capabilities, decryption, or other capabilities or services. In some embodiments, in addition or alternatively, an accelerator among accelerators 1742 provides field select controller capabilities as described herein. In some cases, accelerators 1742 can be integrated into a CPU socket (e.g., a connector to a motherboard or circuit board that includes a CPU and provides an electrical interface with the CPU). For example, accelerators 1742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1742 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1720 represents the main memory of system 1700 and provides storage for code to be executed by processor 1710, or data values to be used in executing a routine. Memory subsystem 1720 can include one or more memory devices 1730 such as read-only memory (ROM), flash memory, one or more varieties of random access memory (RAM) such as DRAM, or other memory devices, or a combination of such devices. Memory 1730 stores and hosts, among other things, operating system (OS) 1732 to provide a software platform for execution of instructions in system 1700. Additionally, applications 1734 can execute on the software platform of OS 1732 from memory 1730. Applications 1734 represent programs that have their own operational logic to perform execution of one or more functions. Processes 1736 represent agents or routines that provide auxiliary functions to OS 1732 or one or more applications 1734 or a combination. OS 1732, applications 1734, and processes 1736 provide software logic to provide functions for system 1700. In one example, memory subsystem 1720 includes memory controller 1722, which is a memory controller to generate and issue commands to memory 1730. It will be understood that memory controller 1722 could be a physical part of processor 1710 or a physical part of interface 1712. For example, memory controller 1722 can be an integrated memory controller, integrated onto a circuit with processor 1710.

In some examples, OS 1732 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

While not specifically illustrated, it will be understood that system 1700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1700 includes interface 1714, which can be coupled to interface 1712. In one example, interface 1714 represents an interface circuit, which can include standalone components and integrated circuitry. In one example, multiple user interface components or peripheral components, or both, couple to interface 1714. Network interface 1750 provides system 1700 the ability to communicate with remote devices (e.g., servers or other computing devices) over one or more networks. Network interface 1750 can include an Ethernet adapter, wireless interconnection components, cellular network interconnection components, USB (universal serial bus), or other wired or wireless standards-based or proprietary interfaces. Network interface 1750 can transmit data to a device that is in the same data center or rack or a remote device, which can include sending data stored in memory. Network interface 1750 can receive data from a remote device, which can include storing received data into memory. Various embodiments can be used in connection with network interface 1750, processor 1710, and memory subsystem 1720. Various embodiments of network interface 1750 use embodiments described herein to receive or transmit timing related signals and provide protection against circuit damage from misconfigured port use while providing acceptable propagation delay.

In one example, system 1700 includes one or more input/output (I/O) interface(s) 1760. I/O interface 1760 can include one or more interface components through which a user interacts with system 1700 (e.g., audio, alphanumeric, tactile/touch, or other interfacing). Peripheral interface 1770 can include any hardware interface not specifically mentioned above. Peripherals refer generally to devices that connect dependently to system 1700. A dependent connection is one where system 1700 provides the software platform or hardware platform or both on which operation executes, and with which a user interacts.

In one example, system 1700 includes storage subsystem 1780 to store data in a nonvolatile manner. In one example, in certain system implementations, at least certain components of storage 1780 can overlap with components of memory subsystem 1720. Storage subsystem 1780 includes storage device(s) 1784, which can be or include any conventional medium for storing large amounts of data in a nonvolatile manner, such as one or more magnetic, solid state, or optical based disks, or a combination. Storage 1784 holds code or instructions and data 1786 in a persistent state (i.e., the value is retained despite interruption of power to system 1700). Storage 1784 can be generically considered to be a "memory," although memory 1730 is typically the executing or operating memory to provide instructions to processor 1710. Whereas storage 1784 is nonvolatile, memory 1730 can include volatile memory (i.e., the value or state of the data is indeterminate if power is interrupted to system 1700). In one example, storage subsystem 1780 includes controller 1782 to interface with storage 1784. In one example controller 1782 is a physical part of interface 1714 or processor 1710 or can include circuits or logic in both processor 1710 and interface 1714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory includes a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1700. More specifically, power source typically interfaces to one or multiple power supplies in system 1700 to provide power to the components of system 1700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z."

Illustrative examples of the devices, systems, and methods disclosed herein are provided below. An embodiment of the devices, systems, and methods may include one or more, and combination of, the examples described below.

Example 1 includes an apparatus comprising: a network device to provide a reliable transport protocol for packet transmission using an Address Family of an express Data Path (AF_XDP) queue framework, wherein the AF_XDP queue framework is to provide a queue for received packet receipt acknowledgements (ACKs).

Example 2 includes one or more examples, wherein: an AF_XDP socket is to connect a service with a driver for the network device, one or more queues are associated with the AF_XDP socket, and at least one of the one or more queues comprises a waiting queue for received packet receipt ACKs.

Example 3 includes one or more examples, wherein: at least one of the one or more queues is to identify one or more packets for which ACKs have been received.

Example 4 includes one or more examples, wherein: the network device is to re-transmit a packet identified by a descriptor in the waiting queue based on non-receipt of an ACK associated with the packet from a receiver.

Example 5 includes one or more examples, wherein: at least one of the one or more queues is to identify at least one completed descriptor that is available for reuse.

Example 6 includes one or more examples, and includes: a processor-executed device driver for the network device, the processor-executed device driver to provide a packet sequence number for packets to be transmitted by the network device.

Example 7 includes one or more examples, wherein the network device comprises one or more of: a network interface controller (NIC), a SmartNIC, an infrastructure processing unit (IPU), a data processing unit (DPU), and/or network device that is part of a system on chip (SoC).

Example 8 includes one or more examples, and includes: a server to execute a service that is to request transmission of at least one packet that is subject to packet receipt ACK, wherein the server is to execute a virtual machine or container and wherein the virtual machine or container is to utilize reliable transport based on the AF_XDP queue framework.

Example 9 includes one or more examples, and includes an apparatus comprising: a network device to provide a reliable transport protocol for packet transmission using an Address Family of an express Data Path (AF_XDP) queue framework, wherein the AF_XDP queue framework is to provide a queue to track received packet sequence numbers and provide a gap for a non-received packet sequence number.

Example 10 includes one or more examples, wherein: an AF_XDP socket is to connect a service with a driver for the network device, one or more queues are associated with the AF_XDP socket, and at least one of the one or more queues comprises the queue to track received packet sequence numbers and provide a gap for a non-received packet sequence number.

Example 11 includes one or more examples, wherein: at least one of the one or more queues is to identify at least one available descriptor that is available to associated with a received packet.

Example 12 includes one or more examples, wherein: based on receipt of a packet having a sequence number corresponding to the non-received packet sequence number, update the gap to identify the sequence number corresponding to the non-received packet sequence number and provide access to packet payloads associated with one or more received packet sequence numbers.

Example 13 includes one or more examples, and includes a device driver for the network device, the device driver to identify packet sequence numbers in received packets.

Example 14 includes one or more examples, wherein the network device comprises one or more of: a network interface controller (NIC), a smart NIC, an infrastructure processing unit (IPU), and/or a data processing unit (DPU).

Example 15 includes one or more examples, and includes a server to execute a service that is to process at least one payload of at least one packet associated with a received packet sequence number.

Example 16 includes one or more examples, and includes a method comprising: forming a connection with a receiver network device, wherein the connection comprises use of an Address Family of an express Data Path (AF_XDP) framework to provide a queue pair for packet transmission and packet receipt.

Example 17 includes one or more examples, wherein: an AF_XDP socket is to connect a service with a driver for a transmitter network device, one or more queues are associated with the AF_XDP socket, and at least one of the one or more queues comprises a waiting queue for received packet receipt ACKs.

Example 18 includes one or more examples, wherein: at least one of the one or more queues is to identify at least one completed descriptor that is available for reuse.

Example 19 includes one or more examples, wherein: an AF_XDP socket is to connect a service with a driver for a transmitter network device, one or more queues are associated with the AF_XDP socket, and at least one of the one or more queues comprises the queue to track received packet sequence numbers and provide a gap for a non-received packet sequence number.

Example 20 includes one or more examples, wherein: at least one of the one or more queues is to identify at least one available descriptor that is available to associated with a received packet.

Example 21 includes one or more examples, and includes a non-transitory computer-readable medium comprising instructions stored thereon, that if executed by one or more processors, cause the one or more processors to: provide a reliable transport protocol for packet transmission by a network device using an Address Family of an express Data Path (AF_XDP) queue framework, wherein the AF_XDP queue framework is to provide a queue for received packet receipt acknowledgements (ACKs).

Example 22 includes one or more examples, wherein: an AF_XDP socket is to connect a service with a driver for the network device, one or more queues are associated with the AF_XDP socket, and at least one of the one or more queues comprises a waiting queue for received packet receipt ACKs.

Example 23 includes one or more examples, wherein: at least one of the one or more queues is to identify one or more packets for which ACKs have been received and at least one of the one or more queues is to identify at least one completed descriptor that is available for reuse.

The invention claimed is:

1. An apparatus comprising:
   at least one processor;
   at least one memory comprising instructions stored thereon, that if executed by the at least one processor, cause the at least one processor to:
   offload reliable transport management to a network interface device, wherein the reliable transport management is based on quick User Datagram Protocol (UDP) Internet Connections (QUIC) and wherein the network interface device is to perform header split to copy a packet header and a packet payload to different destinations and
   based on received packet receipt acknowledgements (ACKs), track packets to be resent, by access to one or more kernel space queues that are also accessible in user space.

2. The apparatus of claim 1, wherein the at least one memory compris es instructions stored thereon, that if executed by the at least one processor, cause the at least one processor to:
   identify descriptors available for reuse into the one or more kernel space queues that are also accessible in user space.

3. The apparatus of claim 1, wherein content stored in the one or more kernel space queues are also accessible in user space without copying from memory accessible to user space to a memory accessible kernel space.

4. The apparatus of claim 1, wherein:
   a socket is to connect a service with a driver for the network interface device,
   the one or more kernel space queues are associated with the socket, and
   at least one of the one or more kernel space queues comprises a waiting queue for received packet receipt acknowledgements (ACKs).

5. The apparatus of claim 1, wherein the one or more kernel space queues are based on an Address Family of an eXpress Data Path (AF_XDP) queue framework.

6. The apparatus of claim 1, wherein:
   at least one of the one or more kernel space queues is to identify one or more packets for which one or more ACKs have been received.

7. The apparatus of claim 1, wherein the at least one processor is to execute a service that is to request transmission of at least one packet that is subject to receipt of an ACK.

8. The apparatus of claim 1, comprising the network interface device to transmit at least one packet based on a request from the at least one processor.

9. A non-transitory computer-readable medium comprising instructions stored thereon, that if executed by one or more processors, cause the one or more processors to:
   offload reliable transport management to a network interface device, wherein the reliable transport management is based on quick User Datagram Protocol (UDP) Internet Connections (QUIC) and wherein the network interface device is to perform header split to copy a packet header and a packet payload to different destinations.

10. The non-transitory computer-readable medium of claim 9, comprising instructions stored thereon, that if executed by one or more processors, cause the one or more processors to:
    track packets to be resent, based on received packet receipt acknowledgements (ACKs), into one or more kernel space queues that are also accessible in user space, wherein the one or more kernel space queues that are also accessible in user space are to identify descriptors available for reuse.

11. The non-transitory computer-readable medium of claim 10, wherein:
    a socket is to connect a service with a driver for the network interface device,
    the one or more kernel space queues are associated with the socket, and
    at least one of the one or more kernel space queues comprises a waiting queue for received packet receipt acknowledgements (ACKs).

12. The non-transitory computer-readable medium of claim 10, wherein:
    the one or more kernel space queues are based on an Address Family of an express Data Path (AF_XDP) queue framework.

13. An apparatus comprising:
    a network interface device comprising circuitry to perform offloaded reliable transport for packet transmission based on a queue framework comprising one or more kernel space queues that are also accessible in user space, wherein the reliable transport is based on quick User Datagram Protocol (UDP) Internet Connections (QUIC) and wherein the circuitry is to perform header split to copy a packet header and a packet payload to different destinations.

14. The apparatus of claim 13, wherein the one or more kernel space queues that are also accessible in user space are to track packets to be resent, based on received packet receipt acknowledgements (ACKs).

15. The apparatus of claim 13, wherein:
    the network interface device is to re-transmit a packet based on non-receipt of an acknowledgement (ACK) of packet receipt.

16. The apparatus of claim 13, wherein:
    at least one of the one or more kernel space queues is to identify at least one available descriptor that is available to associated with a received packet.

17. The apparatus of claim 13, wherein the network interface device comprises circuitry to:
    based on receipt of a packet having a sequence number corresponding to a non-received packet sequence number, provide access to one or more packet payloads associated with one or more received packet sequence numbers.

18. The apparatus of claim 13, wherein the network interface device comprises one or more of: a network interface controller (NIC), a smart NIC, an infrastructure processing unit (IPU), and/or a data processing unit (DPU).

19. The apparatus of claim 13, comprising a server comprising at least one processor that is to execute a service that is to request transmission of at least one packet that is subject to receipt of an acknowledgement (ACK).

20. The apparatus of claim 13, comprising a server comprising at least one processor that is to execute a service that is to process at least one payload of at least one packet associated with a received packet sequence number.

* * * * *

UNITED STATES PATENT AND TRADEMARK OFFICE
CERTIFICATE OF CORRECTION

PATENT NO. : 12,199,888 B2
APPLICATION NO. : 18/425968
DATED : January 14, 2025
INVENTOR(S) : Shaopeng He et al.

Page 1 of 1

It is certified that error appears in the above-identified patent and that said Letters Patent is hereby corrected as shown below:

In the Claims

Claim 2: "The apparatus of claim 1, wherein the at least one memory compris es instructions stored thereon, that if executed by the at least one processor, cause the at least one processor to:" should read The apparatus of claim 1, wherein the at least one memory comprises instructions stored thereon, that if executed by the at least one processor, cause the at least one processor to:

Signed and Sealed this
Eighth Day of April, 2025

Coke Morgan Stewart
*Acting Director of the United States Patent and Trademark Office*